(12) United States Patent
Surnilla et al.

(10) Patent No.: US 7,891,336 B2
(45) Date of Patent: Feb. 22, 2011

(54) DIFFERENTIAL TORQUE OPERATION FOR INTERNAL COMBUSTION ENGINE

(75) Inventors: Gopichandra Surnilla, West Bloomfield, MI (US); Al Henry Berger, Brownstown, MI (US); Wan Joe Chen, Ann Arbor, MI (US); Christopher House, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/349,424

(22) Filed: Jan. 6, 2009

(65) Prior Publication Data
US 2009/0107458 A1 Apr. 30, 2009

Related U.S. Application Data

(62) Division of application No. 11/744,994, filed on May 7, 2007, now Pat. No. 7,503,312.

(51) Int. Cl.
*F02D 41/00* (2006.01)
(52) U.S. Cl. .............................. 123/406.23; 123/406.45; 701/103
(58) Field of Classification Search ................. 123/478, 123/481, 198 F, 406.23, 406.25, 406.35, 123/406.36, 406.45, 295, 305, 431, 691, 123/692; 701/101–105, 112, 115, 109, 110
See application file for complete search history.

(56) References Cited

U.S. PATENT DOCUMENTS

| 4,691,288 A | 9/1987 | Kay et al. |
| 4,697,561 A | 10/1987 | Citron |
| 4,805,571 A * | 2/1989 | Humphrey ................... 123/316 |
| 5,255,638 A * | 10/1993 | Sasaki et al. ............ 123/184.57 |
| 5,408,974 A | 4/1995 | Lipinski et al. |
| 5,562,086 A | 10/1996 | Asada et al. |
| 5,590,628 A * | 1/1997 | Patyi et al. ............. 123/184.55 |
| 5,699,252 A | 12/1997 | Citron et al. |
| 6,247,449 B1 | 6/2001 | Persson |
| 6,360,724 B1 * | 3/2002 | Suhre et al. .................. 123/481 |
| 6,898,510 B2 * | 5/2005 | Roth et al. .................... 701/114 |
| 6,978,204 B2 | 12/2005 | Surnilla et al. |
| 7,004,294 B2 * | 2/2006 | Williams ..................... 188/378 |
| 7,028,660 B2 * | 4/2006 | Rutten ...................... 123/198 F |
| 7,128,052 B1 * | 10/2006 | Reed et al. .............. 123/406.45 |
| 7,246,595 B1 | 7/2007 | Hoare et al. |
| 7,249,583 B2 | 7/2007 | Bidner et al. |
| 7,249,594 B2 | 7/2007 | Hashiguchi |
| 7,261,076 B2 * | 8/2007 | Hoevermann ............. 123/179.4 |
| 7,376,505 B2 | 5/2008 | Skala et al. |
| 7,377,236 B2 | 5/2008 | Reed et al. |
| 7,380,535 B2 * | 6/2008 | Hartmann et al. ......... 123/198 F |
| 7,426,915 B2 | 9/2008 | Gibson et al. |

* cited by examiner

*Primary Examiner*—Stephen K Cronin
*Assistant Examiner*—Johnny H Hoang
(74) *Attorney, Agent, or Firm*—Allan J. Lippa; Alleman Hall McCoy Russell & Tuttle LLP

(57) ABSTRACT

A method adjusts a torque differential between firing cylinders based on engine speed such that greater torque differentials are provided at higher engine speeds. Further, the torque differential may be adjusted based on the firing pattern of the cylinders.

16 Claims, 15 Drawing Sheets

| Example Firing Patterns for Four Cylinder Engine | | | | |
|---|---|---|---|---|
| | 1 | 2 | 3 | 4 |
| Pattern 1010 | S | W | S | W |
| Pattern 1012 | S | S | W | S |
| Pattern 1014 | W | W | S | W |
| Pattern 1016 | S | S | W | W |
| Pattern 1018 | W | W | S | S |

FIG. 10A

| Example Firing Patterns for Six Cylinder Engine | | | | | | |
|---|---|---|---|---|---|---|
| | 1 | 2 | 3 | 4 | 5 | 6 |
| Pattern 1020 | S | W | S | W | S | W |
| Pattern 1022 | S | S | W | S | S | W |
| Pattern 1024 | W | W | S | W | W | S |
| Pattern 1026 | S | S | W | W | S | S |
| Pattern 1028 | W | W | S | S | W | W |
| Pattern 1030 | S | S | S | W | S | S |
| Pattern 1032 | W | W | W | S | W | W |

FIG. 10B

| Example Firing Patterns for Eight Cylinder Engine | | | | | | | | |
|---|---|---|---|---|---|---|---|---|
| | 1 | 2 | 3 | 4 | 5 | 6 | 7 | 8 |
| Pattern 1040 | S | W | S | W | S | W | S | W |
| Pattern 1042 | S | S | W | W | S | S | W | W |
| Pattern 1044 | S | S | S | W | S | S | S | W |
| Pattern 1046 | S | S | S | W | S | S | S | S |
| Pattern 1048 | W | W | W | S | W | W | W | S |
| Pattern 1050 | W | W | W | S | W | W | W | W |

FIG. 10C

DIFFERENTIAL TORQUE OPERATION FOR INTERNAL COMBUSTION ENGINE

CROSS REFERENCE TO PARENT APPLICATION

This present application is a divisional of U.S. application Ser. No. 11/744,994 filed May 7, 2007 now U.S. Pat. No. 7,503,312, entitled "Differential Torque Operation for Internal Combustion Engine", naming Gopichandra Surnilla, Al Berger, Wan Chen, and Christopher House as inventors, the entire contents of which are incorporated herein by reference.

BACKGROUND AND SUMMARY

Various control strategies have been employed to improve fuel efficiency of an internal combustion engine. As one example, engines have been operated in what may be referred to as variable displacement operation or partial cylinder mode, whereby combustion in one or more cylinders of the engine is temporarily discontinued or deactivated when operating at partial load. In this way, the engine may be operated with a lower number of firing cylinders, thereby improving fuel efficiency under these partial load conditions.

However, when some of the engine cylinders are deactivated to improve fuel efficiency, the noise and vibration harshness (NVH) may increase. The increase in NVH may be caused by the reduction in positive torque from the deactivated cylinders. In one approach as set forth, for example, by U.S. Pat. No. 6,247,449, the change in torque may be counteracted by changing the amount of torque produced by the remaining firing cylinders by differentiating the amount of fuel supplied to these cylinders.

The inventors herein have also recognized issues with the above approach. In particular, the above approach differentiates the amount of fuel provided to the cylinders to suppress vibration without recognizing how the fuel differentiation should be controlled with respect to engine speed. Furthermore, the above approach relies solely on fuel differentiation to counteract for the deactivation of one or more of the engine cylinders, which may result in reduced vibration at the cost of reduced fuel efficiency, under some conditions. Further still, the above approach utilizes fuel differentiation only where at least one cylinder of the engine is deactivated. As such, the inventors herein have recognized several issues with the approach taken by U.S. Pat. No. 6,247,449.

As another approach, recognized by the inventors of the present disclosure, the above issues may be addressed by a method of operating an internal combustion engine having a plurality of cylinders including at least a first cylinder and a second cylinder, the method comprising: firing the first cylinder and the second cylinder in an alternating sequence; during a first mode, adjusting an operating parameter of the engine to produce a first difference between an amount of torque produced by the firing of the first cylinder and an amount of torque produced by the firing of the second cylinder; during a second mode, adjusting the operating parameter of the engine to produce a second difference between an amount of torque produced by the firing of the first cylinder and an amount of torque produced by the firing of the second cylinder; and performing the first mode at a higher engine speed than the second mode; wherein the first difference is greater than the second difference.

In this way, the inventors of the present disclosure have recognized that fuel efficiency may be increased while also reducing NVH even during conditions where engine cylinders are not deactivated by increasing the torque differential between at least two groups of firing cylinders with increasing engine speed. Note that in some examples, the torque differential between two groups of cylinders may be adjusted by adjusting airflow to at least one group of cylinders without necessarily adjusting the amount of fuel delivered to the cylinders. Also, note that the alternating firing of the cylinder may be non-consecutive, or may be consecutive. Further note that while in some examples achieve advantageous operation without fuel differentiation, in other examples fuel differentiation may be used.

BRIEF DESCRIPTION OF THE DRAWINGS

FIGS. 10A, 10B, and 10C are tables illustrating example firing patterns for some engines.

DETAILED DESCRIPTION

Figure 1A:
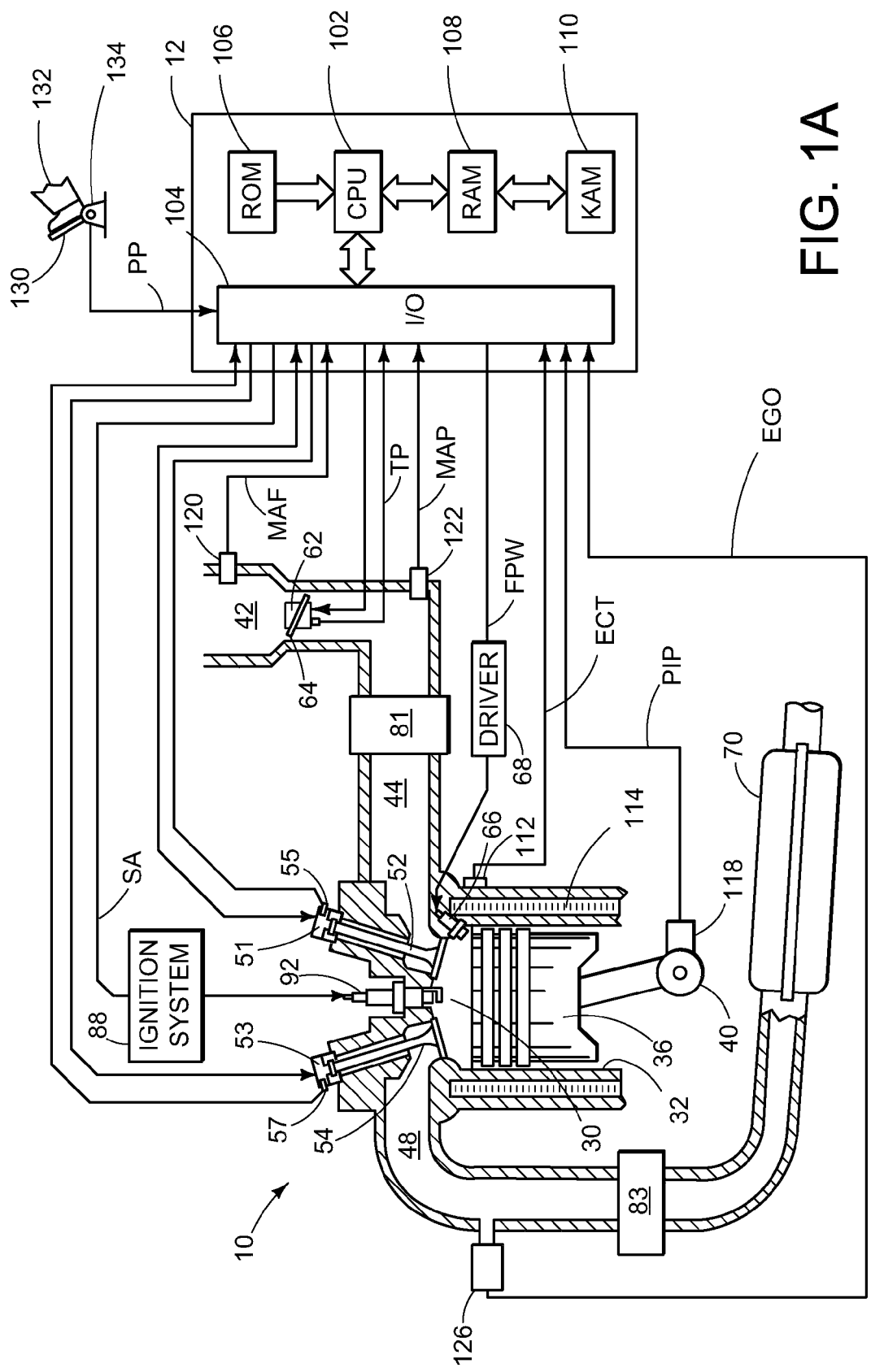
FIGS. 1A, 1B, and 1C schematically illustrate partial engine views.
Figure 1B:
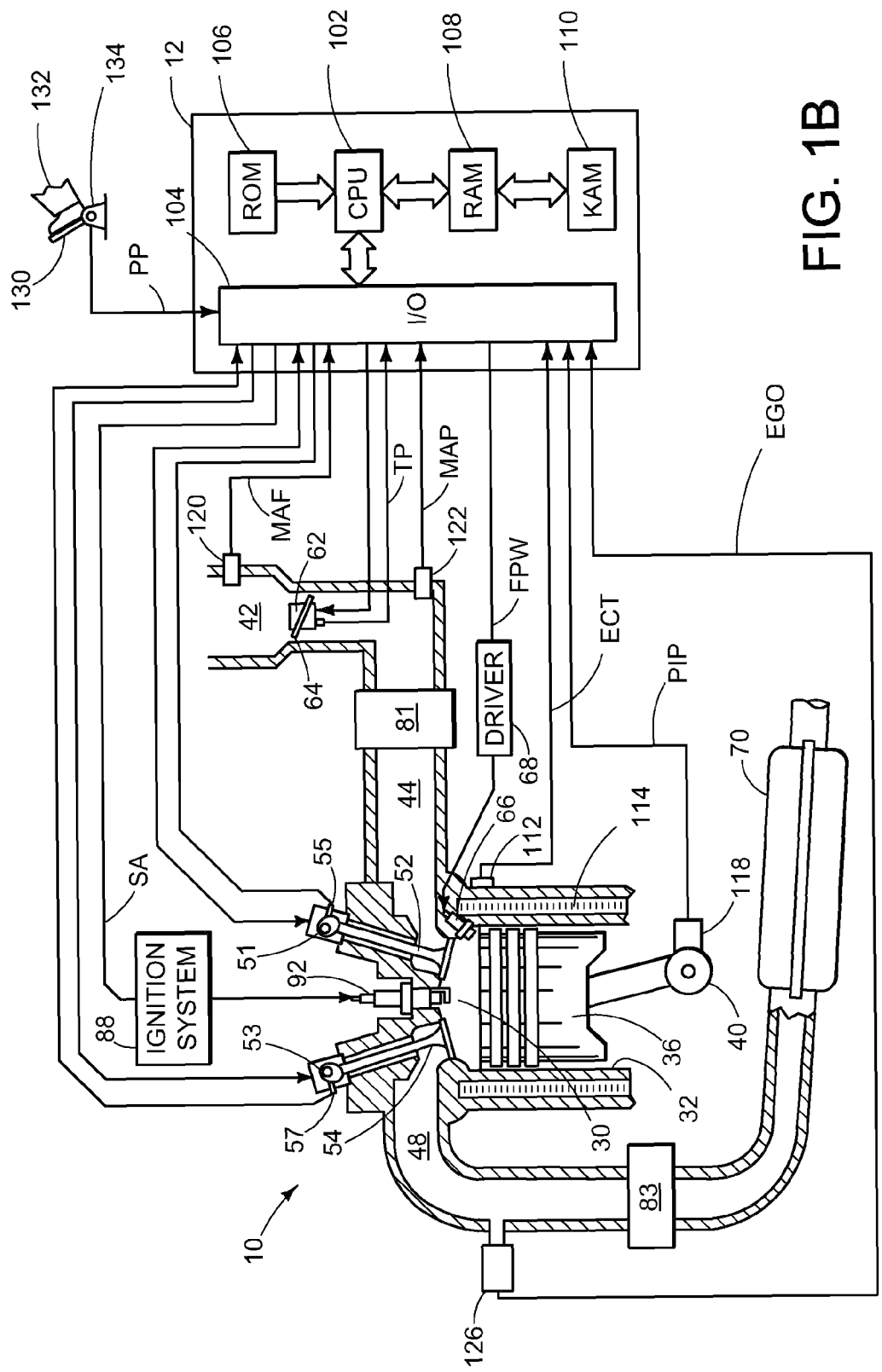
Figure 1C:
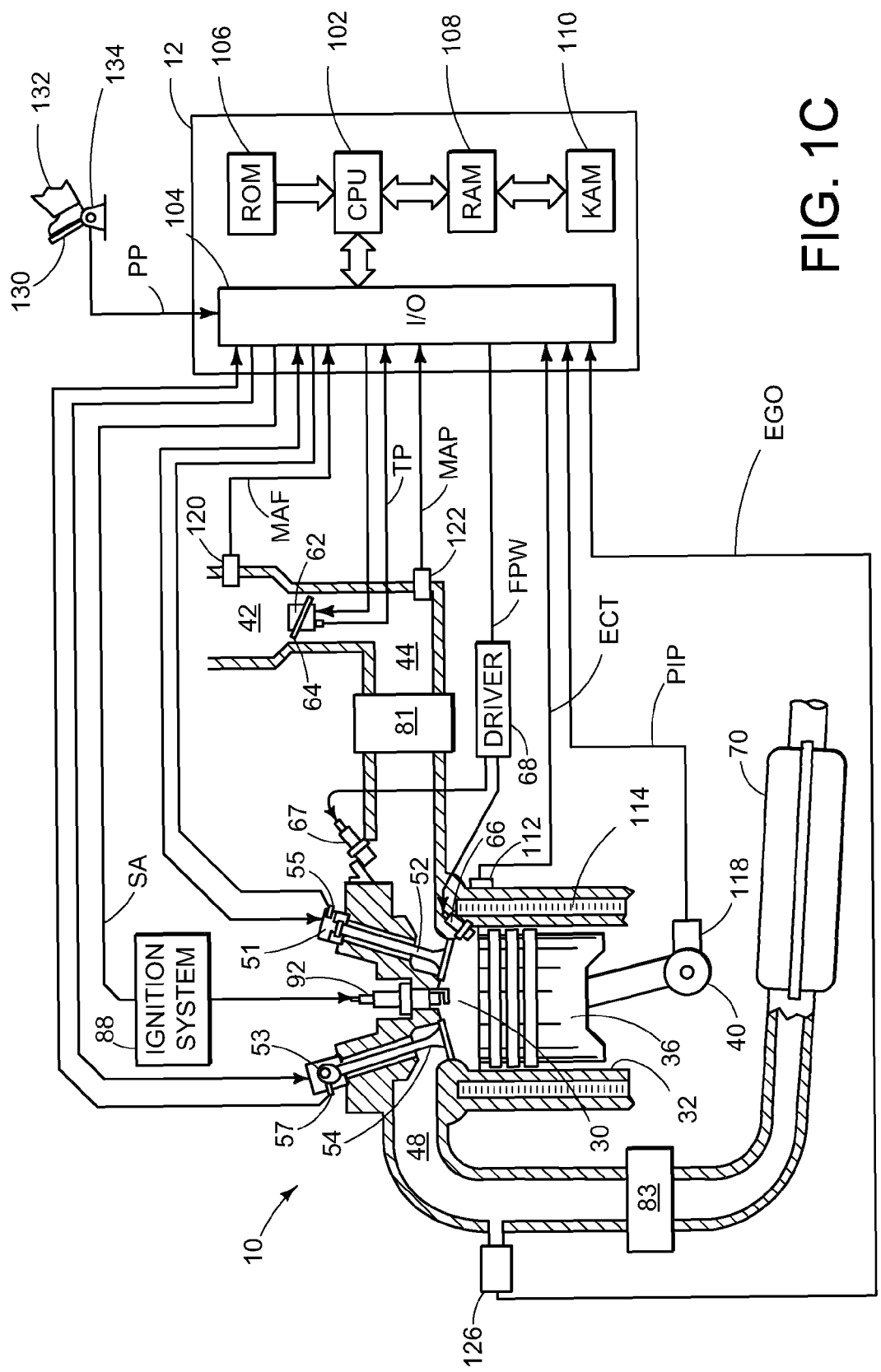
Figure 1D:
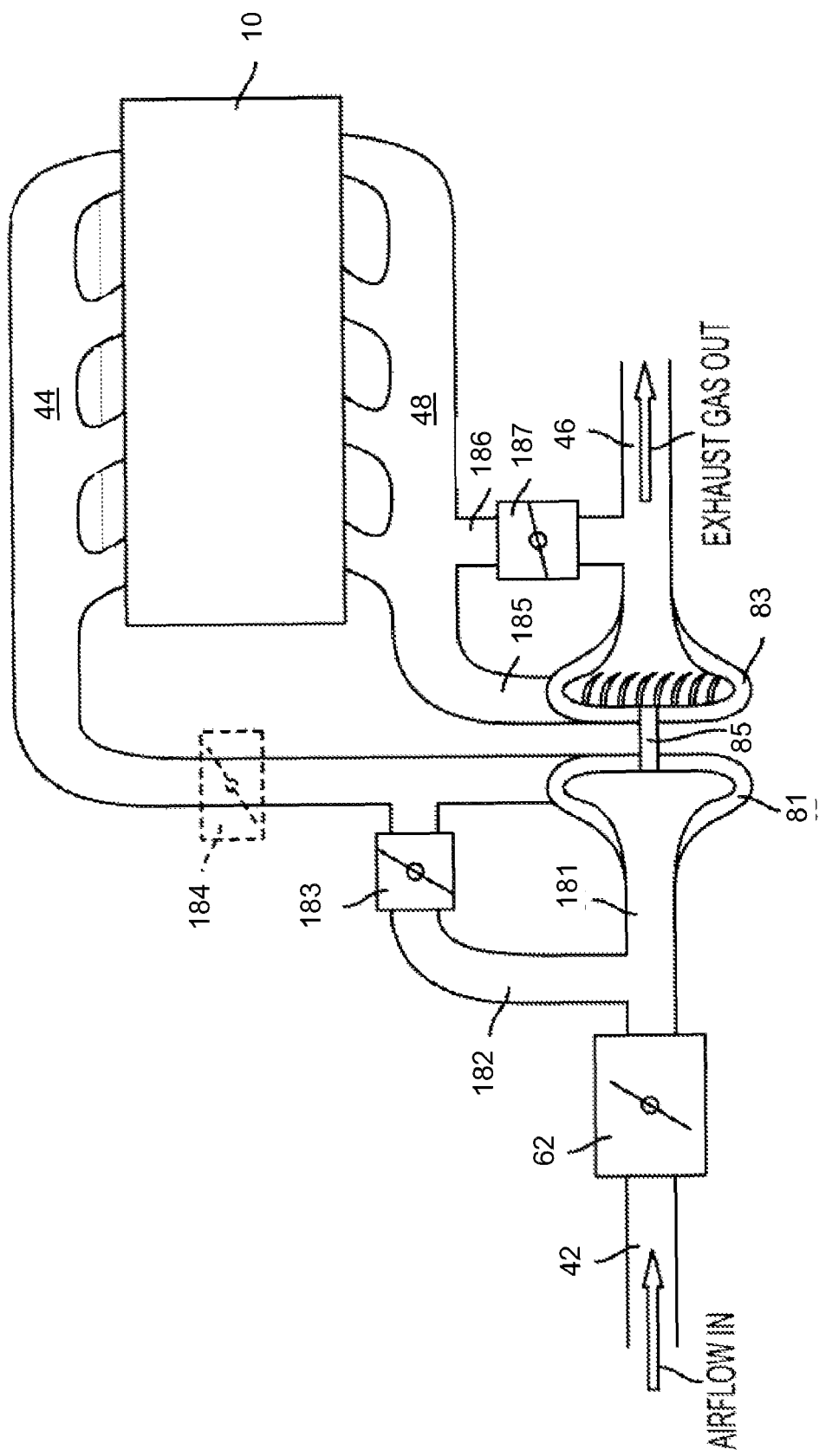
FIG. 1D schematically illustrates an example engine with boosting device.
Figure 2A:
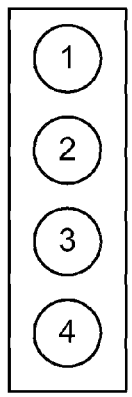
FIGS. 2A, 2B, and 2C illustrate example multi-cylinder engines.
Figure 2B:
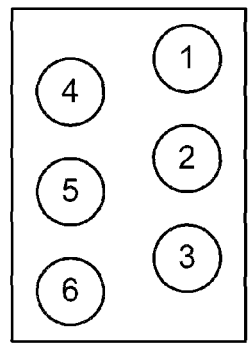
Figure 2C:
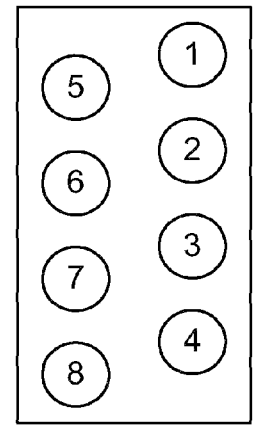

An approach for varying a torque differential between at least two groups of cylinders of an internal combustion engine in response to at least an operating condition of the engine will be described herein in greater detail. Referring now to FIGS. 1 and 2, various engine configurations will be described, which may be used with the various control strategies described herein. In particular, FIGS. 1A, 1B, and 1C illustrate example cylinders of a multi-cylinder internal combustion engine while FIG. 1D illustrates an example engine including a boosting device. FIGS. 2A, 2B, and 2C illustrate example engines having multiple cylinders.

Engine 10, which may be represented by the various engine configurations illustrated by FIGS. 1 and 2, among others, may be controlled at least partially by a control system including at least a controller 12. An example cylinder or combustion chamber 30 of engine 10 may include combustion chamber walls 32 with moveable piston 36 positioned therein. Piston 36 can be coupled to crankshaft 40, which may in turn be coupled to at least one drive wheel of a vehicle via an intermediate transmission system as will be described in greater detail with reference to FIG. 3. Further, in some embodiments, a starter motor or other motor may be coupled to crankshaft 40, for example, via a flywheel (not shown) to enable at least a starting operation of engine 10.

Referring in particular to FIG. 1D, Engine 10 can receive intake air from intake manifold 44 via intake passage 42 and can exhaust combustion gases to exhaust passage 46 via exhaust manifold 48. In some embodiments, intake passage 42 can include a boosting device including a compressor 81 of a turbocharger or a supercharger. Further, exhaust passage 46 can include an exhaust gas turbine 83 for at least partially powering compressor 81. Thus, as one example, a boosting device can include a turbocharger having a compressor 81 and turbine 83 which may be mechanically coupled via shaft 85 so that torque generated by the turbine by the flow of exhaust gases through 185 may be transmitted to the compressor. The compressor in turn, may increase the mass flow rate of airflow to the engine via compressor passage 181. Further, the intake system of the engine may include a compressor bypass passage 182 including a bypass valve 183 and/or a secondary throttle 184 for controlling airflow to the engine. The exhaust system of the engine may include a turbine bypass passage 186 including a bypass valve 187 for controlling the airflow supplied to turbine 83. Controller 12 of the control system may be communicatively coupled to valves 183 and 187, and throttle 62 to control their respective positions. By controlling bypass valves 183 and/or 187, the level of boost provided to the engine or particular cylinders of the engine coupled to the boosting device may be adjusted. In some embodiments, turbine 83 may include what may be referred to as a variable geometry turbine that can enable the control system of the engine to vary the position of the turbine vanes in order to vary the level of boost supplied to the engine.

Referring again to FIGS. 1A, 1B, and 1C, intake manifold 44 and exhaust manifold 48 may be shared with one or more cylinders of engine 10, for example, as illustrated in FIG. 1D. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

As illustrated in FIG. 1A, intake valve 52 may be controlled by controller 12 via electric valve actuator (EVA) 51. Similarly, exhaust valve 54 may be controlled by controller 12 via EVA 53. During select conditions, controller 12 may vary the signals provided to electric valve actuators 51 and 53 to adjust the opening and closing of the respective intake and exhaust valves. The position of intake valve 52 and exhaust valve 54 may be identified by controller 12 via valve position sensors 55 and 57, respectively. Where multiple intake valves or multiple exhaust valves are included with the cylinder, the valves may similarly include a corresponding electric valve actuator and/or a valve position sensor communicating with controller 12. In this way, the control system can be configured to adjust the opening timing, closing timing, and/or valve lift of each of the valves, thereby enabling the control system to control the delivery of air and/or fuel to the combustion chamber.

Alternatively, as illustrated in FIG. 1B, intake valve 52 and exhaust valve 54 may be controlled by cam actuation via cam actuation systems 51 and 53, respectively. Cam actuation systems 51 and 53 may each include one or more cams arranged on a camshaft that rotate in relation to the rotation of crankshaft 40. The cam actuators associated with the intake and exhaust valves can include cam profile switching (CPS) systems, variable cam timing (VCT) or variable valve timing (VVT) systems, and/or variable valve lift (VVL) systems. In this way, the operation of the intake and exhaust valves may be adjusted by controller 12. For example, CPS or VVL may be used to vary the lift height and/or lift profile of a particular valve. As another example, VCT or VVT may be used to adjust the opening and/or closing timing of the intake and exhaust valves. The position of intake valve 52 and exhaust valve 54 may be identified by controller 12 by position sensors 55 and 57, respectively.

As yet another example, some of the intake and/or exhaust valves can utilize EVA while some of the intake and/or exhaust valves can utilize cam actuation. For example, FIG. 1C illustrates an example where at least one exhaust valve of the cylinder may be controlled by cam actuation and at least one intake valve may be controlled by EVA. Further, in some examples, at least one intake valve may be controlled by cam actuation and at least one exhaust valve may be controlled by EVA.

In the example illustrated in FIG. 1C, the cylinder is shown including a port fuel injector 66 and a direct fuel injector 67. However, in some examples, a cylinder may include only a direct injector as illustrated in FIGS. 1A and 1B where the port injector may be omitted, or alternatively may include only a port injector and the direct injector may be omitted. Therefore, it should be appreciated that FIG. 1C has been provided with both port and direct injectors to illustrate the various combinations of fuel injector and valve system configurations that are possible for an example cylinder of engine 10.

For example, port fuel injector 66 may be arranged in intake manifold 44 in a configuration that provides fuel to an intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. Fuel injector 67 may be configured to inject fuel directly into the combustion chamber in proportion to the pulse width of signal FPW received from controller 12 via electronic driver 68. The direct fuel injector 67 may be mounted in the side of the combustion chamber or in the top of the combustion chamber, for example. Fuel may be delivered to direct injector 67 by a fuel system (not shown) including a fuel tank, a fuel pump, and a fuel rail. Note that in some embodiments, fuel injectors 66 and 67 may utilize separate electronic drivers.

In some embodiments, two different fuels or substances may be provided to combustion chamber 30 (among other combustion chambers of the engine) in varying ratios. As one non-limiting example, a first fuel including a higher alcohol concentration may be selectively supplied to the combustion chamber by direct injector 67 and a second fuel including a lower concentration of alcohol than the first fuel may be supplied to the combustion chamber by port injector 66. Alternatively, a first fuel and a second fuel may be provided to the cylinder in varying ratios via a single injector. For example, a fuel mixture may be delivered to the cylinder via one or two fuel injectors, whereby the first fuel can include at least ethanol and the second fuel can include at least gasoline having a lower concentration of ethanol than the first fuel. As will be described in greater detail herein, the amount of alcohol such as ethanol or methanol that is supplied to the cylinder can be varied with the amount of torque or load of the cylinder. For example, the amount of ethanol delivered to a cylinder may be increased with an increasing level of boost provided to the cylinder, with an increasing level of torque produced by the cylinder, with an increasing engine speed, and/or with an increasing load of the cylinder. In this way, a relative amount of two fuel types may be varied on a per cylinder basis to enable variation among cylinders responsive to the amount of torque and/or load produced by each cylinder of the engine. As will be described in greater detail herein, the fuel mixture delivered to each cylinder may be varied responsive to various operating conditions and parameters.

Intake passage 42 may include a throttle 62 having a throttle plate 64. However, in some embodiments, throttle 62 may be omitted or may be located downstream of compressor 81, for example as indicated at 184 of FIG. 1D. The position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other cylinders of the engine. The position of throttle plate 64 may be provided to controller 12 by throttle position signal TP. Intake passage 42 and/or intake manifold 44 may include a mass air flow sensor 120 and a manifold air pressure sensor 122 for providing respective signals MAF and MAP to controller 12.

In some embodiments, combustion chamber 30 may be controlled to achieve combustion by spark ignition. For example, an ignition system 88 can provide an ignition spark to combustion chamber 30 via spark plug 92 in response to spark advance signal SA from controller 12, under select operating modes. Though spark ignition devices are shown, in some embodiments, combustion chamber 30 or one or more other cylinders of engine 10 may be operated in a compression ignition mode, with or without an ignition spark. For example, one or more cylinders of the engine may be controlled to achieve combustion by compression ignition or more specifically by homogeneous charge compression ignition (HCCI), in some examples. Further, in some examples, spark plug 92 and ignition system 88 may be omitted.

In some embodiments, the air/fuel ratio of each cylinder of the engine may be controlled on a per cylinder basis by adjusting the relative amount of air and fuel that is delivered to each cylinder. For example, combustion chamber 30 may be operated in a lean mode, a stoichiometric mode, or a rich mode. As described herein, the lean mode may include the delivery of air/fuel ratios to the cylinder that is greater than stoichiometry while the rich mode may include the delivery of air/fuel ratios to the cylinder that is less than stoichiometry. Note that the stoichiometric mode refers to air/fuel mixtures that are substantially stoichiometric. Further still, the particular air/fuel mixture that is formed within the cylinder just prior to combustion may be varied by adjusting the timing of fuel injection via a fuel injector or air delivery via intake or exhaust valve timing and/or lift. In some embodiments, the air/fuel mixture within the combustion chamber just prior to ignition may be controlled to be substantially homogeneous, such as during HCCI mode, or stratified. Thus, it should be appreciated that a variety of combustion modes may be combined, for example, to achieve a homogeneous lean mode, a stratified lean mode, a homogeneous rich mode, a stratified rich mode, a homogeneous stoichiometric mode, and/or a stratified stoichiometric mode. Further, ignition in these modes may be achieved by spark ignition or compression ignition to provide even greater variety of combustion modes that may be utilized on a per cylinder basis. Thus, a particular mode may be selected for each cylinder on a per cylinder basis to control the amount of torque produced by each cylinder while maintaining combustion stability and/or increasing fuel efficiency.

One or more exhaust gas sensors such as sensor 126 may be included in exhaust manifold 48 and/or exhaust passage 46 upstream of an emission control device 70. Sensor 126 can be any suitable sensor for providing an indication of an exhaust gas condition to the control system. For example, sensor 126 can be configured to indicate air/fuel ratio such as by way of a linear oxygen sensor or UEGO (universal or wide-range exhaust gas oxygen), a two-state oxygen sensor or EGO, a HEGO sensor (heated EGO), a NOx sensor, HC sensor, or CO sensor, among others. One or more emission control devices such as device 70 may be arranged along the exhaust passage. Device 70 may include a three way catalyst (TWC) NOx trap, or particulate filter, among various other emission control devices. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Controller 12 can receive control input from a vehicle operator or driver 132 via an input device 130. In this example, input device 130 includes an accelerator pedal and a pedal position sensor 134 for generating a proportional pedal position signal PP. In some embodiments, the engine may include an NVH sensor for detecting a level of noise and vibration harshness produced by the engine.

As described above, FIGS. 1A, 1B, and 1C illustrate various examples of one cylinder of a multi-cylinder engine, and that each cylinder may similarly include its own set of intake/exhaust valves, fuel injector, spark plug, intake passage, exhaust passage, etc.

As illustrated in FIGS. 2A, 2B, and 2C, the multiple cylinders of engine 10 can be arranged in various configurations. FIG. 2A illustrates engine 10 arranged in what may be referred to as an in-line configuration including four cylinders. However, more or fewer cylinders are possible with the in-line configuration of FIG. 2A. FIG. 2B illustrates engine 10 including six cylinders arranged in what may be referred to as a V-6 configuration. FIG. 2C illustrates engine 10 including eight cylinders arranged in what may be referred to as a V-8 configuration. Thus, engine 10 can be configured with a first bank of cylinders and a second bank of cylinders. For example, with regards to the V-6 engine illustrated by FIG. 2B, a first bank (e.g. right bank) of cylinders may include cylinders identified by cylinder identification numbers 1, 2, and 3, while a second bank (e.g. left bank) of cylinders may include cylinders identified by cylinder identification numbers 4, 5, and 6. With regards to the V-8 engine illustrated by FIG. 2C, a first bank of cylinders may include cylinders identified by cylinder identification numbers 1, 2, 3, and 4, while the second bank of cylinders may include cylinders identified by cylinder identification numbers 5, 6, 7, and 8. It should be appreciated that the configurations of FIGS. 2A, 2B, 2C are non-limiting examples of engine 10 and that other configurations are possible such as opposed cylinder configurations. Furthermore, it should be appreciated that engine 10 may include any suitable number of cylinders such as 2, 3, 5, 7, 9, 10, 11, 12, or more cylinders.

Note that engine 10 may include as few as two cylinders, for example, where the firing order may be represented by the cylinder identification numbers as: 1-2-1-2-1-2, etc., whereby 1 identifies the first cylinder and 2 identifies the second cylinder. As another example, the engine may include four cylinders in an in-line configuration (e.g. as shown in FIG. 2A) where the firing order may be represented by the cylinder identification numbers as: 1-3-4-2, etc. With regard to six cylinder engines, the firing order may be represented by the cylinder identification numbers as: 1-4-2-5-3-6, for example. Alternatively, other firing orders may be used for six cylinder engines including: 1-3-2-5-4-6, 1-3-6-5-4-2, 1-4-6-5-3-2, or 1-6-5-4-3-2, among other suitable firing orders. With regard to eight cylinder engines, the firing order may be represented by the cylinder identification numbers as: 1-3-7-2-6-5-4-8, or alternatively as 1-5-4-2-6-3-7-8, among other suitable firing orders.

As one non-limiting example, a firing order for an engine may be selected so that two consecutively firing cylinders do not share the same exhaust manifold, since exhaust gases delivered to a common exhaust manifold at nearly the same time by two cylinders may impact exhaust flow. For example, with four stroke six cylinder engines utilizing evenly spaced firing intervals, each firing event is approximately 120 crankshaft degrees apart, and each exhaust event lasts approximately 180 crankshaft degrees, which would result in an overlap between two exhaust events. However, in alternative embodiments, firing orders may be selected that utilize consecutively firing cylinders sharing a common exhaust manifold. Thus, different engine configurations can have different firing orders. It should be appreciated that the firing orders described herein, for example, with regards to FIGS. 7A, 7B, and 7C for V-6 and V-8 engines are non-limiting examples and that other firing orders are possible.

Note that each of the cylinders associated with the various engine configurations may be the same or may include one or more of the variations described herein with reference to FIG. 1. For example, a first cylinder associated with a first bank of the engine may include both intake and exhaust EVA systems whereas a cylinder as a first cylinder associated with a second bank of the engine may include a cam actuation system.

Figure 3:
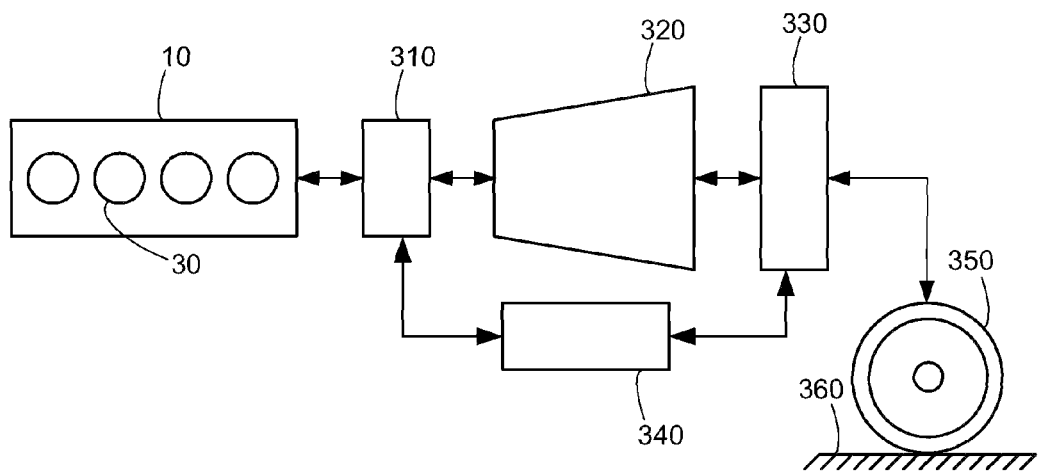
FIG. 3 schematically illustrates an example hybrid propulsion system for a vehicle.

Referring now to FIG. 3, an example vehicle system is illustrated including engine 10. In this particular example, engine 10 can provide torque to at least one drive wheel 350 communicating with a ground surface 360 via transmission system 320. Furthermore, in some embodiments, engine 10 may be configured in what may be referred to as a hybrid propulsion system. For example, as illustrated in FIG. 3, the hybrid propulsion system may be configured for a hybrid electric vehicle (HEV) that includes one or more electric motors 310 and/or 330, and an energy storage device 340. While FIG. 3 illustrates a system having two motors, it should be appreciated that in some embodiments, only one of motors 310 and 330 may be included.

As one non-limiting example, motor 310 and/or motor 330 can exchange torque with the vehicle driveline coupling engine 10 to transmission 320. This exchange of torque may include conditions where the motor supplies torque to the driveline and/or conditions where the motor absorbs torque from the driveline. Thus, the torque exchanged between a motor and the driveline may be likewise exchanged with the engine and/or transmission. Where at least one motor supplies torque to the driveline of the vehicle, energy may be supplied to the motor from energy storage device 340. Alternatively, where at least one motor absorbs torque from the driveline, energy may be supplied from the motor to the energy storage device where it may be stored. As one example, energy storage device 340 may include a battery. As will be described in greater detail herein, at least one motor may be selectively operated by the control system responsive to a condition of engine 10.

Figure 4A:
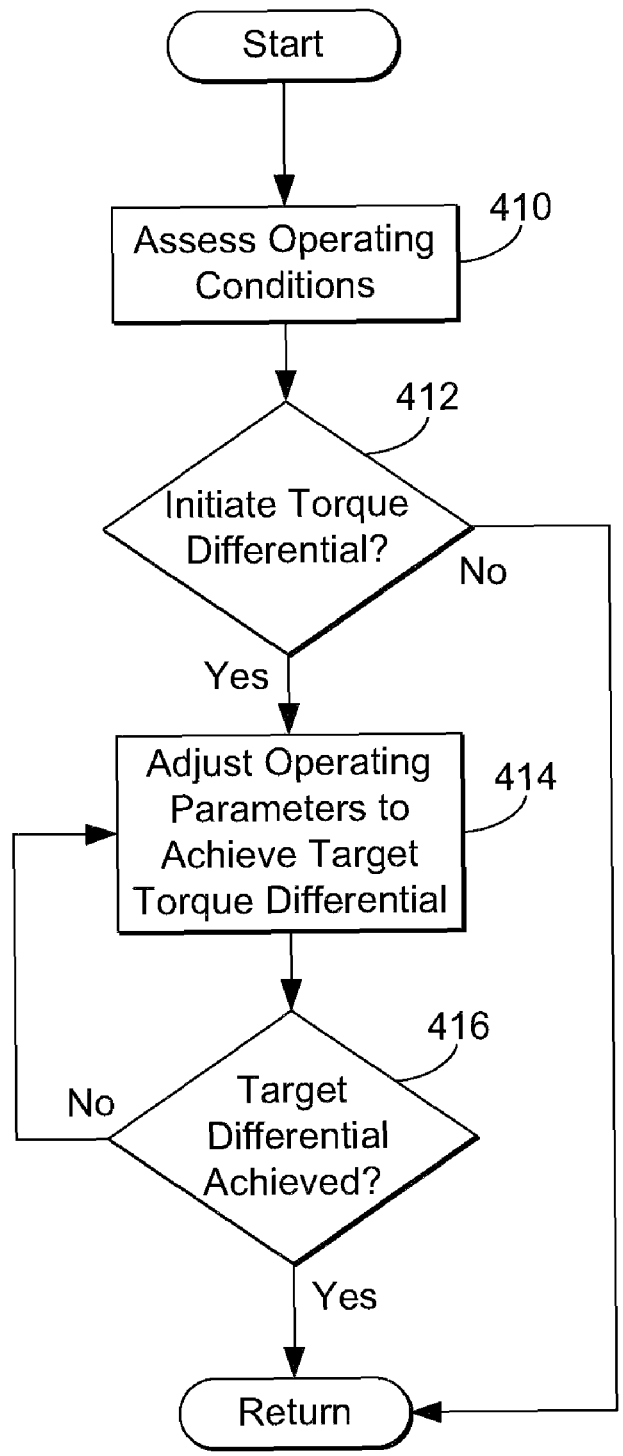
FIGS. 4A, 4B, and 4C are flow charts illustrating example control strategies.

Referring now to FIG. 4A, a flow chart is illustrated describing an example approach for selecting a torque differential between at least two cylinders of an engine. Beginning, at 410, present, past, and/or predicted future operating conditions may be assessed, for example, via one or more sensors communicating with the engine control system. Operating conditions may include, but are not limited to the following: engine speed, engine load, engine temperature, a level of noise and vibration harshness (NVH) produced by the engine system, a number of cylinders that are actively performing combustion or are firing, a combustion mode of each cylinder, a fuel injection amount, a fuel injection timing, a fuel type, a spark timing, a combustion timing, an aftertreatment device condition or state, an air-fuel ratio, a valve timing, a valve lift, cam actuation settings, a level of boost provided by a boosting device such as a turbocharger or supercharger, an airflow rate through an intake passage of the engine, a throttle position, an accelerator pedal position, a time since a previous engine event, a transmission conditions such as the selected gear ratio or clutch state, and a battery state of charge, among others. As one non-limiting example, controller 12 can identify the current speed and load of the engine. As another example non-limiting example, controller 12 can identify a level of noise and vibration harshness (NVH) resulting from a particular engine operation. Note that operating conditions may be assessed on an individual cylinder basis and/or on an engine system basis.

Figure 6A:
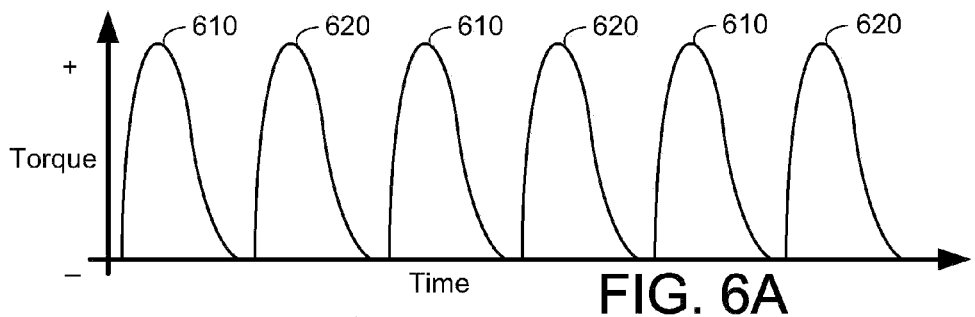
FIGS. 6A, 6B, 6C, 6D, and 6E are graphs illustrating example engine torque pulsations.

At 412, it may be judged whether to initiate a torque differential between two or more cylinders of the engine. For example, as illustrated in FIG. 6C, a first cylinder can be operated as a stronger cylinder producing a higher level of torque than a second cylinder operating as a weaker cylinder, whereby the first and second cylinders alternate firing sequence. Note that the alternating firing sequence can be consecutive or non-consecutive. As described herein, a non-consecutive alternating firing sequence may include other cylinder firing between the first and the second cylinders, while the consecutive firing sequence may refer to examples where the first and second cylinders or groups of cylinders are fired in an order that precludes interstitial firing events of other cylinders.

The decision at 412 may be based on the operating conditions assessed at 410. For example, a torque differential may be initiated above a particular engine speed threshold or NVH threshold, or over a particular engine speed range. If the answer at 412 is no, the routine may return. For example, where a torque differential is not requested, the engine may operate as illustrated in FIG. 6A, as will be described in greater detail herein.

Figure 4B:
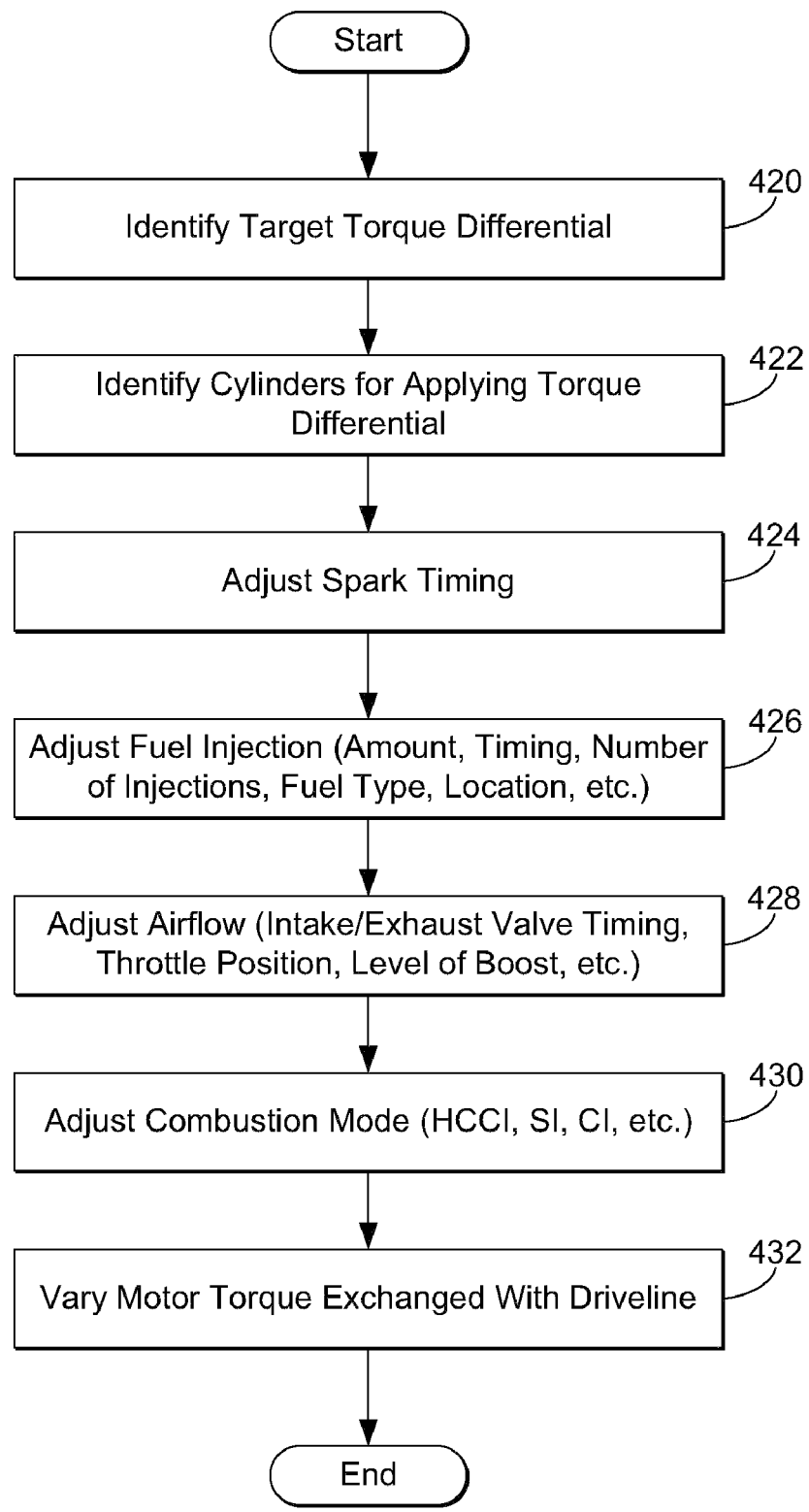
Figure 5A:
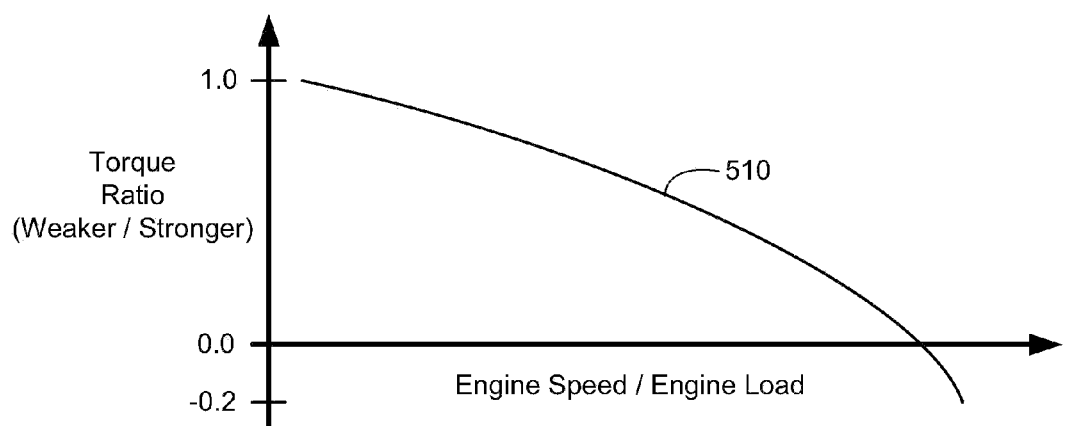
FIG. 5A is a graph illustrating how a torque ratio between two groups of engine cylinders may be varied with an operating condition such as engine speed or engine load.

Alternatively, if the answer at 412 is yes (i.e. differential torque operation is to be initiated), one or more operating parameters may be adjusted at 414 to achieve the target torque differential between two or more cylinders of the engine. Note that the target torque differential may be selected from a look-up table stored in memory of the control system and/or may be identified from a learned relationship based on the various operating conditions assessed at 410. FIG. 5A illustrates an example torque differential that may be selected for a given engine speed or engine load. FIG. 4B provides a more detailed explanation of the various operating parameters that may be adjusted at 414 to achieve the target torque differential between two or more groups of cylinders.

In some embodiments, operating parameters associated with a first group of engine cylinders may be adjusted to serve as the stronger (produce greater torque) firing cylinders of the engine and/or operating parameters associated with a second group of cylinders may be adjusted to serve as the weaker (produce less torque) cylinders. For example, the stronger cylinders may be adjusted to increase the torque output while the weaker cylinders may be adjusted to reduce the torque output in order to maintain a similar total torque output of the engine or to provide the total torque requested by the vehicle operator.

At 416, it may be judged whether the various adjustments performed at 414 where sufficient to achieve the target torque differential or whether the target level of NVH has been reduced. If the answer is yes, the routine may return to 410 or alternatively end. Alternatively, if the answer at 416 is no, the routine may return to 414 where the operating parameters may be further adjusted or where different operating parameters may be adjusted. In this way, an engine control system can be configured to vary a differential amount of torque produced by two or more cylinders or groups of cylinders of the engine responsive to various operating conditions.

FIG. 4B is a flow chart illustrating an example approach for adjusting one or more operating parameters of the engine system to achieve the target torque differential, for example, as described with reference to the operation performed at 414 of FIG. 4A. At 420, the control system may identify the target torque differential. The target torque differential may be selected based on the speed of the engine, the engine load, the selected firing pattern of the cylinders, target NVH levels, among other operating conditions assessed at 410. For example, the target torque differential between cylinders may be increased with increasing engine speed, for example, as described with reference in FIGS. 5A and 5B.

At 422, one or more cylinders of the engine may be identified for application of the torque differential based on a selected firing pattern of the engine. Some example firing patterns are described in greater detail with reference to FIG. 10. Note that the total number of engine cylinders may be divided into two or more groups by the control system, whereby the torque differential is applied between at least two of the groups of cylinders. Each group of cylinders may include one or more cylinders of the engine. For example, with regards to a six cylinder engine, the control system may select a first group of cylinders as including five of the six cylinders of the engine and the second group of cylinders as including one cylinder. As another example, the control system may select the first group of cylinders to include two cylinders and the second group of cylinders to include four cylinders. As yet another example, the control system may select the first group of cylinders and the second group of cylinders to include the same number of cylinders. Note that the cylinders identified at 422 may be selected based on the torque differential identified at 420. Alternatively, the target torque differential identified at 420 may be based on the firing pattern identified at 422 as directed by a relationship as described with reference to FIG. 5B, for example.

The control system may adjust one or more of the operating parameters described with reference to 424-432 to facilitate the target torque differential between the cylinders identified at 422. For example, at 424, the spark timing of a first cylinder that was identified at 422 may be adjusted relative to a second cylinder to vary an amount of torque produced by the first cylinder, thereby varying the torque differential between the first cylinder and the second cylinder. As one non-limiting example, the torque produced by the first cylinder may be increased by advancing spark timing or may be reduced by retarding spark timing relative to the spark timing of the second cylinder.

At 426, a fuel delivery condition may be adjusted to vary an amount of torque produced by at least one cylinder. For example, one or more of a fuel injection amount, a fuel injection timing, a number of fuel injections performed per cycle, and/or a type of fuel injected into the cylinder may be varied to increase or decrease the torque of at least one cylinder to achieve the target torque differential between the selected cylinders of a first group of cylinders and another group of cylinders. For example, a first fuel mixture including a higher concentration of alcohol may be supplied to a first group of cylinders and a second fuel mixture including a lower concentration of alcohol than the first fuel mixture may be supplied to the second group of cylinders to produce a torque differential produced by each cylinder of the first group and each cylinder of the second groups of cylinders. Note that fuel mixtures delivered to the engine responsive to other operating parameters. For example, cylinders that are operated at a higher level of boost may be supplied with a fuel mixture including a greater concentration of alcohol than cylinders that are operated with a lower level of boost. In this way, torque differentials may be achieved between two or more groups of cylinders while maintaining combustion stability in each of the cylinders.

At 428, a condition of the intake or exhaust system of the cylinder may be adjusted to vary an amount of torque produced by the cylinder. For example, an intake or exhaust valve timing or lift may be adjusted, a throttle position, a level of boost provided by the boosting device, among other operating parameters may be adjusted to increase or decrease an amount of torque produced by the cylinder or group of cylinders. Note that where a common intake system is used for two cylinders or groups of cylinders utilizing a torque differential, operating parameters that affect both of the cylinders or groups of cylinders equally may not be adjusted, but rather cylinder specific parameters may be adjusted. For example, where two cylinders utilizing a torque differential between them share a common boosting device, the airflow supplied to one of the cylinders may be adjusted differently by varying another operating parameter, such as the valve timing of the particular cylinder or another of the parameters described with reference to 424-432.

Continuing with FIG. 4B, at 430, a combustion mode of one or more cylinders of the engine may be adjusted to create a torque differential between the cylinder or group of cylinders and another cylinder or group of cylinders. For example, the combustion mode of a cylinder may be adjusted between one or more of a spark ignition (SI) mode, a compression ignition (CI) mode, or a homogeneous charge compression ignition (HCCI) mode while other cylinders of the engine may remain in the same mode. Note that SI and CI combustion modes may be combined with different air/fuel mixtures such as homogeneous (e.g. in the case of HCCI), stratified, lean, stoichiometric, rich, etc. to achieve a particular torque output for the cylinder while reducing NVH and increasing fuel efficiency for the cylinder. Note that these different modes of operation may be achieved by varying the timing of fuel injection, the valve timing, and/or spark timing as described above with reference to operations 424, 426, and 428. For example, a first stronger group of cylinders may be operated in a stoichiometric mode via SI or CI while a second weaker group of cylinders may be operated in a lean mode that is also homogenous or stratified via SI or CI. In this way, the torque differential between two groups of cylinders may be varied by operating the two cylinder groups under different modes.

As one non-limiting example, the combustion mode of each cylinder may be selected based on the fuel delivery strategy associated with each of the cylinders. For example, where a first fuel mixture including a greater concentration of an alcohol such as ethanol is supplied to a first group of cylinders and a second fuel mixture including a lower concentration of alcohol than the first fuel mixture is supplied to the second group of cylinders, the first group of cylinders may be operated in SI mode and the second group of cylinders may be operated in CI or HCCI mode. In this way, synergies between the fuel delivery strategy and the combustion mode for a particular cylinder may be achieved. In other words, in the above example, combustion stability may be improved for higher alcohol concentration fuels with SI mode operation and lower alcohol concentration fuels with CI or HCCI mode.

At 432, where the engine is configured in a hybrid propulsion system including at least one motor, the motor may be operated to exchange torque with the vehicle driveline. For example, the motor may be modulated to supply torque to the driveline responsive to the torque differential between two or more cylinders of the engine. The operation of the motor will be described in greater detail with reference to FIGS. 11A and 11B.

Figure 4C:
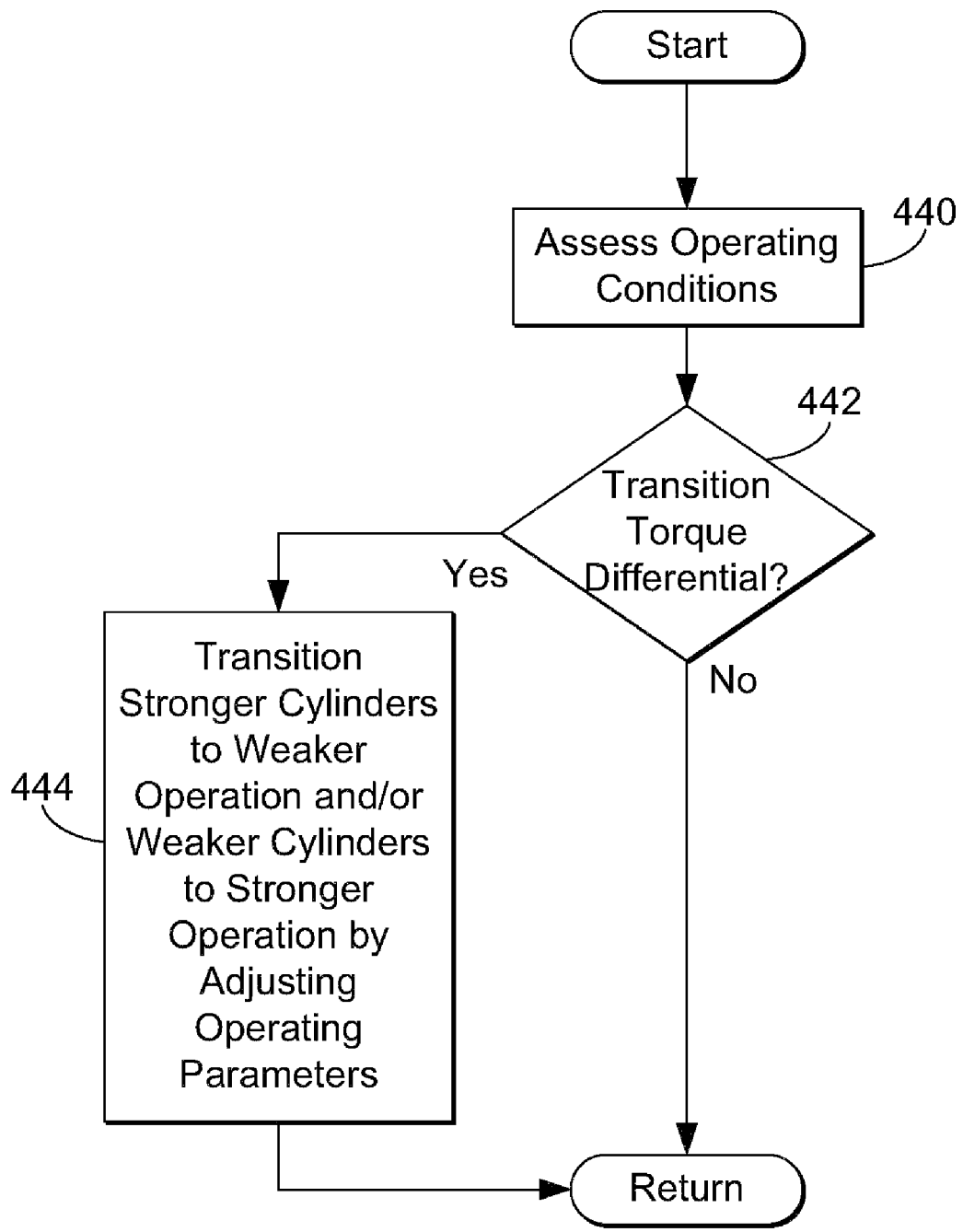

Referring now to FIG. 4C, a control routine will be described for transitioning the torque differential between two or more cylinders or groups of cylinders. The approach described with reference to FIG. 4C can be used to transition the engine between two or more firing patterns, for example, as set forth in the tables of FIG. 10A, 10B, or 10C, among others not expressly recited. At 440, the control system may assess operating conditions of the engine system, for example, as described above with reference to 410. As one example, the control system may assess an amount of time that the engine has been operating with the particular torque differential. At 442, it may be judged whether to transition the torque differential. For example, it may be judged whether to transition some of the stronger cylinders to a condition where they are operated as the weaker cylinders and/or some of the weaker cylinders to a condition where they are operated as the stronger cylinders. As will be described in greater detail with reference to FIGS. 8 and 9, the torque differential may be transitioned in order to rebalance conditions of the engine system. For example, where a first group of cylinders are coupled to a first exhaust system and the second group of cylinders are coupled to a second exhaust system, extended operation of the first group of cylinders as a stronger or weaker group may cause the respective exhaust system to operate at a different temperature than the exhaust system of the other group of cylinders. Such temperature differentials may be reduced by transitioning the torque differential between the two groups of cylinders.

If the answer at 442 is yes (i.e. the torque differential transition is requested), at 444, some of the stronger cylinders may be transitioned to weaker operation and/or some of the weaker cylinders may be transitioned to stronger operation by adjusting one or more of the operating parameters described with reference to FIG. 4B. For example, an operating parameter associated with the stronger cylinders may be adjusted to reduce the torque produced relative to the other cylinders and/or an operating parameter associated with the weaker cylinders may be adjusted to increase the torque produced relative to the other cylinders to achieve the target firing pattern and torque differential. An example transition is illustrated by FIG. 11C. Note that where the engine is transitioned between different firing patterns, for example, as illustrated in FIG. 10, the torque differential may be adjusted with regards to the selected firing pattern, for example, as described herein with reference to FIG. 5B. In other words, the torque differential between the stronger and weaker cylinders may be adjusted differently depending on the selected firing pattern of the engine.

Further, note that in some examples, only some of the cylinders may be transitioned depending on the target firing pattern selected and the current firing pattern. Furthermore, it should be appreciated that the engine may be transitioned between any suitable firing patterns, for example, as described in the tables of FIGS. 10A, 10B, and 10C. Alternatively, if the answer at 442 is no, then the routine may return.

As one example application of the routine describe by FIG. 4C, during warm-up of the engine system where heating of the exhaust system via exhaust gases may be used to raise the temperature of the various exhaust system components, the stronger cylinder group and weaker cylinder group may be switched or transitioned after a prescribed period of time or after a particular temperature condition of the exhaust system has been attained so that equal and/or more rapid heating of different branches of the exhaust system is achieved. In this way, the stronger and weaker cylinders may be alternated between two cylinder groups to reduce the effects of asymmetrical engine operation on a symmetrical exhaust system.

It should be appreciated that the control strategies described with reference to FIGS. 4A, 4B, and 4C that may be performed to adjust the torque produced by a cylinder or group of cylinders, and that the particular strategy employed may be dependant upon the particular engine system configuration, operating conditions, and/or target torque differential requested. Specific example scenarios for application of the strategies described in FIG. 4 will be described in greater detail below.

FIG. 5A is an example graph illustrating a relationship between engine speed and/or engine load, and the target torque differential that may be selected, for example, at 420 of FIG. 4B. The vertical axis of the graph, which includes the target torque differential is represented as the torque ratio, which corresponds to a ratio of the torque produced by the weaker cylinder or group of cylinders to the stronger cylinder or group of cylinders. A torque ratio of 1.0, for example, corresponds to substantially no torque differential between a first and second cylinder or group of cylinders, while a torque differential of 0.0 corresponds to a condition where the lower torque producing cylinder (i.e. weaker cylinder) produces substantially no torque. Further, a negative torque ratio corresponds to a condition where the weaker cylinder is generating a negative torque that is acting against the torque produced by the higher torque producing cylinder (i.e. stronger cylinder or group of cylinders).

The horizontal axis of the graph illustrated in FIG. 5A indicates engine speed (e.g. as a rotational speed of the crankshaft) and/or engine load. Note that with some engine systems, engine speed and engine load may have a positive correlation based on the particular powertrain and transmission coupled with the engine. However, in other engine systems, engine speed and engine load may have a negative correlation. Thus it should be appreciated that the torque ratio illustrated by FIG. 5A may vary with changes in engine speed only, changes in engine load only, changes in engine load and engine speed that have a positive correlation with each other, or changes in engine load and engine speed that have a negative correlation with each other. As can be observed from the function indicated by 510, the torque ratio may be reduced and hence the torque differential between cylinders can be increased with increasing engine speed and/or engine load. The particular function implemented by the control system for varying torque ratio or torque differential with engine speed can be based at least partially on a threshold of the level of NVH that is selected for the particular engine system. For example, the curve indicated at 510 can represent a constant NVH level or can represent an NVH level that is at or below a threshold level across the particular torque ratio and engine speed or load conditions of FIG. 5A. In this way, a suitable torque differential may be selected for two or more cylinders of the engine based on engine speed or engine load to maintain a level of NVH below a threshold level. Note that the function illustrated at 510 may be used by the control system to control the torque differential between two or more cylinders as described with reference to FIG. 4.

Figure 5B:
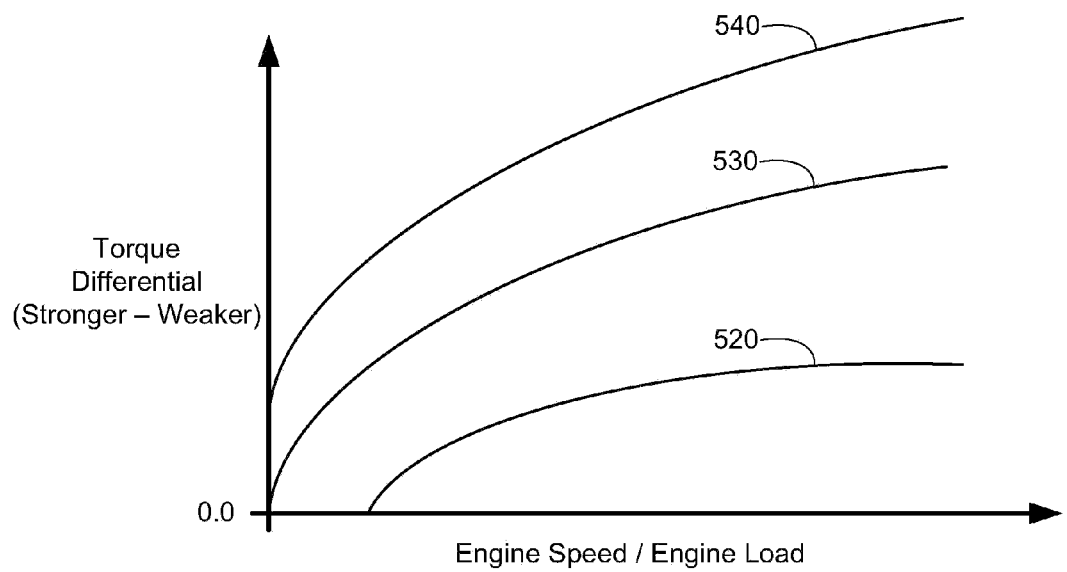
FIG. 5B is a graph illustrating how a torque differential between two groups of engine cylinders may be varied with an operating condition such as engine speed or engine load.

Referring to FIG. 5B, a graph comparing torque differential and engine speed and/or engine load is described for various engine firing patterns that may be selected, for example, as described above with reference to 422. The graph illustrated in FIG. 5B indicates on the vertical axis, the differential torque, which may be represented as the difference between the torque produced by a stronger cylinder and a weaker cylinder. The engine speed and engine load are indicated by the horizontal axis. As indicated by curves 540, 530, and 520, the control system may adjust the level of torque differential with the selected firing pattern of the engine. For example, curve 540 may correspond to a cylinder configuration where the stronger cylinders and the weaker cylinders alternate firing sequence in a consecutive order as illustrated, for example, by FIG. 7A or a non-consecutive order with interstitial firing or non-firing events by other cylinders. Curve 530, on the other hand, may correspond to a different firing pattern that utilizes a different relationship between torque differential and engine speed or load. For example, the curve at 530 may correspond to an alternating firing sequence between the stronger and weaker cylinders, whereby a greater number of stronger cylinders are fired than the number of weaker cylinder, for example, as illustrated by FIG. 7B and further described by pattern 1022 of FIG. 10B. As yet another example, the curve at 540 may correspond to yet another firing pattern having an alternating firing sequence between the stronger and weaker cylinders, whereby a greater number of weaker cylinders are fired than the number of stronger firing cylinders as illustrated, for example, by FIG. 7C and further described by pattern 1024 of FIG. 10B. Thus, it should be appreciated that the control system can control the level of torque differential in a different manner depending on the firing pattern of the engine.

FIG. 6A-6E are graphs illustrating torque pulses for an example engine. As such, the graphs illustrated in FIGS. 6A-6E can be used to describe an engine having any suitable number of cylinders that are fired in an alternating order. FIGS. 6A-6E are ordered in relation from lowest to highest engine speed and/or engine load, for example, as directed by the torque differential curve 510 illustrated in FIG. 5A and one of the torque difference curves illustrated in FIG. 5B.

Referring specifically to FIG. 6A, a torque pulsation for a first firing cylinder is indicated at 610 and a torque pulsation for a second firing cylinder is indicated at 620. Note that while the first and second cylinders are illustrated in FIG. 6A as alternating firing sequence in a consecutive manner, it should be appreciated that the stronger and weaker cylinders may be fired in a non-consecutive manner where other cylinders of the engine may be fired or deactivated between the first cylinder and the second cylinder. In other words, the first cylinder and the second cylinder may still fire in an alternating firing order, but may not necessarily be consecutive firing events of the engine. Furthermore, it should be appreciated that the torque pulsation indicated at 610 can correspond to the firing of a cylinder from a first group of cylinders, while the torque pulsation indicated at 620 can correspond to the firing of a cylinder of a second group of cylinders. Thus, each successive torque pulsation indicated by 610 in FIG. 6A can be produced by a different firing cylinder of the first group of cylinders the engine. Similarly, each successive torque pulsation indicated by 620 in FIG. 6A can be produced by a different firing cylinder of the second group of cylinders.

Figure 6B:
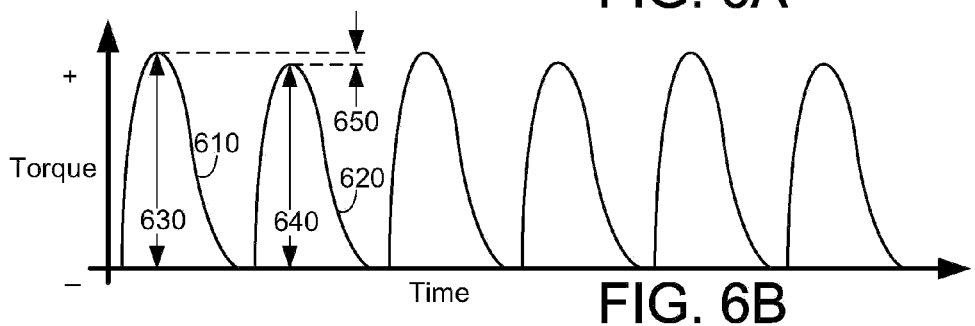
Figure 6C:
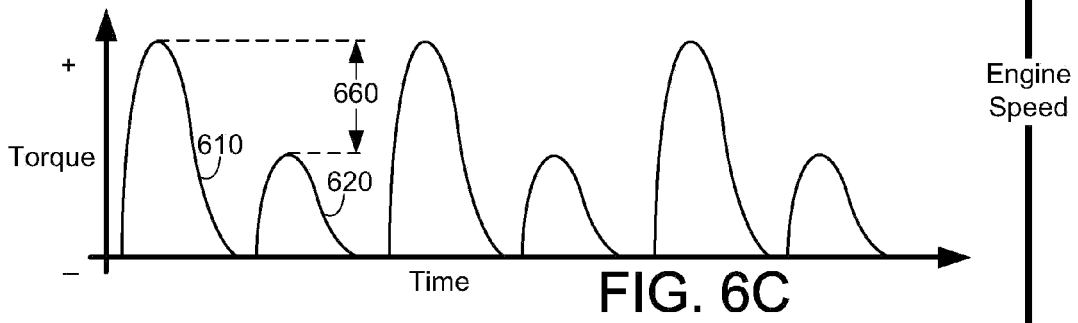

Referring specifically to FIG. 6B, the torque pulsations caused by the firing of the first and the second cylinders or a cylinder of the first group and a cylinder of the second group are again indicated at 610 and 620, respectively. The level of torque produced by the first cylinder is indicated at 630 and the level of torque produced by the second cylinder is indicated at 640. Further, as indicated by 650, a torque difference exists between the level of torque produced by the first cylinder and the level of torque produced by the second cylinder. In contrast, FIG. 6A illustrates the first and second firing cylinders producing substantially similar levels of torque.

As one example, FIGS. 6A and 6B illustrate the torque pulsations for an engine having at least two cylinders or two groups of cylinders that alternate firing, whereby the level of torque produced by each cylinder is substantially equal as illustrated in FIG. 6A or have a small torque differential as illustrated by 650 in FIG. 6B. At lower engine speed operation and/or lower load, such as during idle conditions, all of the cylinders may be operated with substantially equal torque output or with small periodic differences between alternate cylinder torque outputs. Thus, FIGS. 6A and 6B can represent an engine operation at lower engine speeds or loads where no torque differential or a small torque differential is applied, for example, as illustrated by the graph of FIG. 5B.

During higher engine speeds or where the engine is operated under part load conditions, the engine cylinders may be operated with a greater torque differential between alternating firing cylinders as indicated by 660. As illustrated in FIGS. 6A, 6B, and 6C, all of the engine cylinders are operated with a positive torque output. Where all cylinders are producing positive torque, the crankshaft can experience less severe torque reversals than that which may occur with some cylinders producing net negative torque, thereby reducing NVH degradation, under some conditions.

Figure 6D:
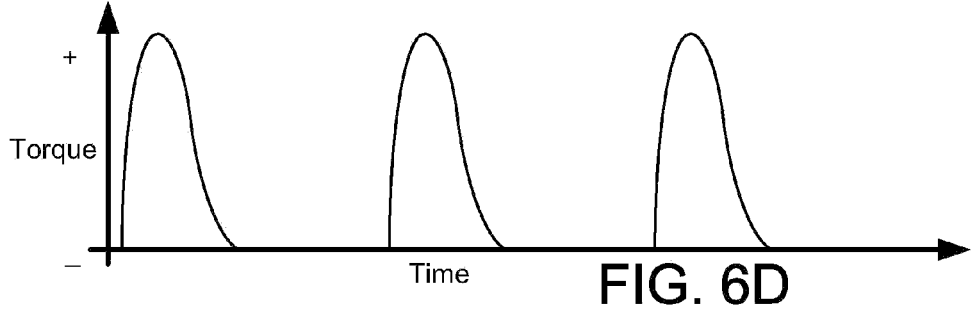

During even higher engine speeds and/or engine loads, the engine may be operated with some cylinders providing higher engine torque and the alternating cylinders providing net zero torque as illustrated in FIG. 6D. The cylinders providing net zero torque can be operated to provide sufficient torque to overcome the pumping work of the particular cylinder and may therefore continue to fire to achieve the net zero torque.

Figure 6E:
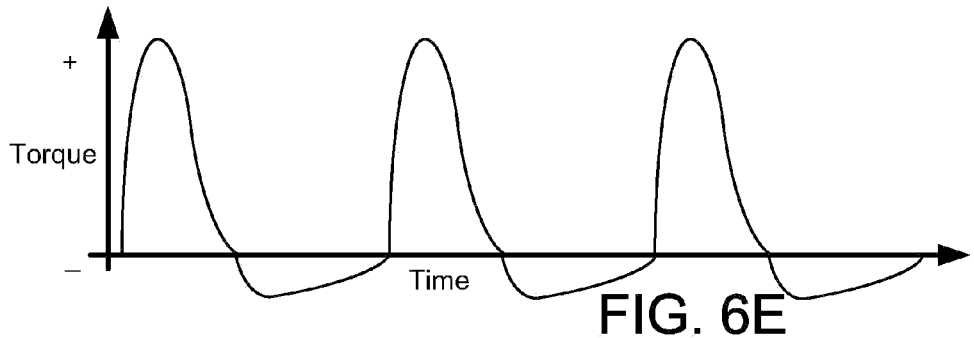

During even higher engine speeds and/or loads, the engine may be operated with only some (e.g. half) of the cylinders producing positive torque and the remaining cylinders producing negative torque as illustrated in FIG. 6E. In other words, the cylinders producing negative torque may be utilizing some of the torque generated by the positive torque producing cylinders for pump work or friction work. As one non-limiting example, one or more cylinders of the engine may produce negative torque by deactivating or discontinuing combustion in the cylinders for one or more engine cycles. Combustion may be discontinued by shutting off the delivery of fuel to the cylinder. Further, as one example, valve operation for a deactivated cylinder may be adjusted to vary the amount of negative torque consumed by the cylinder, for example, by increasing or decreasing pumping work.

Note that the examples illustrated in FIGS. 6A-6E include the same number of stronger and weaker cylinders. However, it should be appreciated that the approaches described herein may be used with any suitable number of stronger cylinders or weaker cylinders. As described in greater detail with reference to FIG. 7, in some conditions, a greater number of stronger cylinders or greater number of weaker cylinders may be used.

Figure 7A:
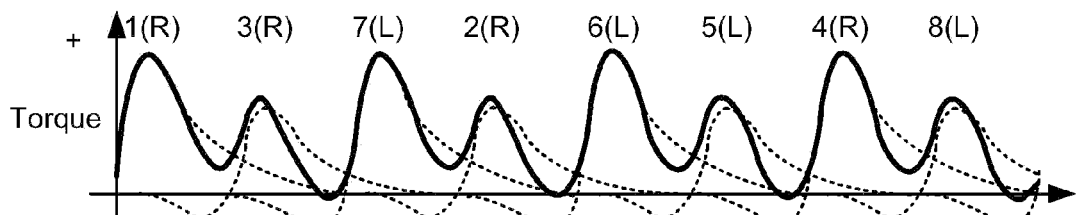
FIGS. 7A, 7B, and 7C are graphs illustrating example engine torque pulsations including individual and combined torque levels.
Figure 7B:
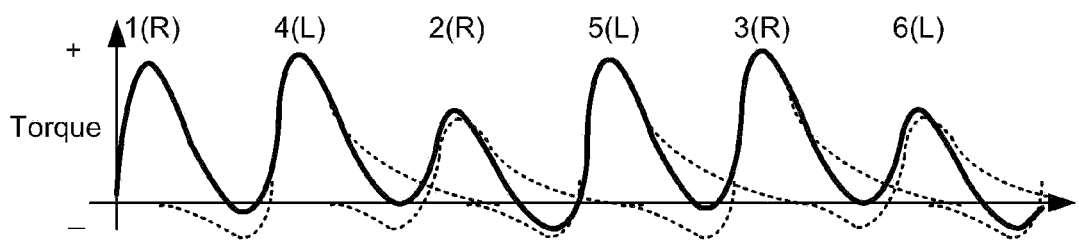
Figure 7C:
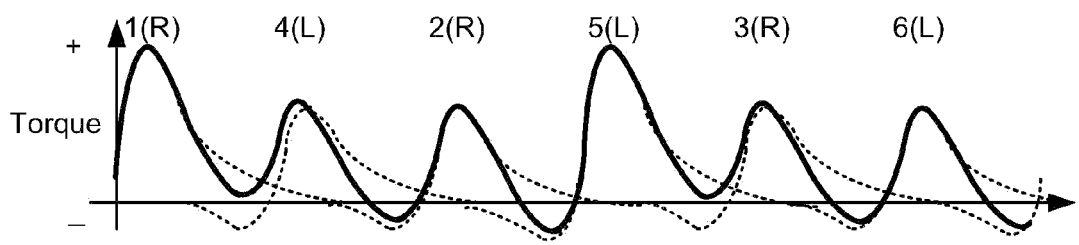

FIG. 7A-7C are graphs illustrating example differential torque operations including the level of instantaneous torque produced by each of the engine cylinders as represented by the lighter curves, and the total torque produced by the engine, represented by the heavier curve, over a 720 degree cycle. For each of FIGS. 7A-7C, the cylinder identification numbers are provided, which may correspond to one of the engines illustrated, for example, by FIGS. 2A-2C. Additionally, for each of FIGS. 7A-7C, the sequential firing events for the engine are provided for the example 720 degree cycle.

In particular, FIG. 7A illustrates a differential torque operation for a V-8 engine including a right bank of four cylinders and a left bank of four cylinders, for example, as illustrated by FIG. 2C. Each of the torque pulsations are labeled with a corresponding cylinder identification number (e.g. 1-8) and bank identification (e.g. right (R) or left (L)). In this particular example, the firing order of the engine cylinders alternate between stronger (e.g. higher torque) and weaker (e.g. lower torque) cylinders by a firing order that corresponds to 1R-3R-7L-2R-6L-5L-4R-8L. However, other suitable patterns may be used.

As will be described in greater detail with reference to FIG. 9, some engines, such as the V-8 engine described with reference to FIG. 7A may include separate exhaust manifolds for the right and left bank of cylinders. Where the V-8 engine utilizes a particular firing order and manifold configuration, each of the exhaust manifolds can receive exhaust gases from two strong firing cylinders and two weak firing cylinders. For example, V-8 engines having cruciform crankshafts as well as some in-line four cylinder engines can provide substantially equal exhaust heating and/or products of combustion to each of the exhaust manifolds where consecutively alternating stronger and weaker cylinders are utilized. In this way, the two exhaust manifolds may be substantially balanced or receive products of combustion symmetrically.

However, with some engine configurations, such as with Vee engines having sequential firing between the right and left cylinder banks (e.g. right-left-right-left), consecutively firing strong and weak cylinders in an alternating manner may cause the exhaust gases produced by the strong cylinders to flow through a first exhaust manifold and the exhaust gases produced by the weak firing cylinders to flow through a second exhaust manifold. For example, some V-6 or V-10 engines, as well as V-8 engines with planar crankshafts may fire in a sequence that alternates between cylinders from the right and left banks. Where this type of firing order is combined with alternating stronger and weaker engine cylinders, the exhaust system may receive products of combustion in an asymmetric manner. Such asymmetry may result in unequal heating or ageing of exhaust system devices or components including various aftertreatment devices, since exhaust from the stronger cylinders may be received by the first exhaust manifold and exhaust from the weaker cylinders may be received by the second exhaust manifold. Further, under certain operating conditions, for example, during cold start or warm-up of the engine system, whereby heat is supplied to the exhaust manifolds to increase the temperature of the aftertreatment system, the weaker firing cylinders may take longer to provide sufficient heating to their respective exhaust system devices. As another example, the aftertreatment devices associated with a particular weaker or stronger cylinder group may become saturated with exhaust gas products more rapidly than other aftertreatment devices associated with the other cylinder group due to this type of asymmetrical operation.

Therefore, under some conditions, the engine may be operated with a mixture of stronger and weaker cylinders with each cylinder bank or for each exhaust manifold coupled thereto. For example, FIG. 7B illustrates an example operation for a six cylinder engine as illustrated by FIG. 2B. In this particular example, each bank of three cylinders is operated by alternating two stronger firing cylinders and one weaker cylinder. Thus, the firing order of the engine cylinders in this example corresponds to: 1R, 4L, 2R, 5L, 3R, 6L over a 720 degree cycle. This firing pattern is further illustrated by firing pattern 1022 of FIG. 10B. In this manner, the engine may be operated so that the exhaust manifolds receive similar quantities of exhaust heat and/or products of combustion.

As illustrated in FIG. 7C, an engine such as, for example, a V-6 may be operated with one stronger cylinder and two weaker cylinders per cylinder bank, thereby providing a similar amount of exhaust heat and/or products of combustion to each exhaust manifold. Thus, in this example, the firing order of the engine cylinders again corresponds to 1R, 4L, 2R, 5L, 3R, 6L, but utilizes a different firing pattern indicated, for example, by 1024 of FIG. 10B, whereby two weaker cylinders are alternated with one stronger cylinder. Thus, the firing events of an engine need not necessarily consecutively alternate every other cylinder as either stronger or weaker, but may be operated such that two or more stronger, or two or more weaker cylinders are alternated with at least another of a stronger or a weaker cylinder. While the approach of consecutively alternating every other cylinder between a stronger cylinder or a weaker cylinder can be used to produce less NVH under some conditions than operating with two or more stronger or weaker cylinders in a consecutive sequential order, the approaches described with reference to FIGS. 7B and 7C can nevertheless be used under some conditions where greater symmetry of exhaust system operation is desired.

Note that the example firing patterns described with reference to FIGS. 7A, 7B, and 7C can be accompanied by different control characteristics, for example, as described with reference to FIG. 5B. As one non-limiting example, the torque differential may increase more rapidly with increasing speed for the consecutively alternating firing pattern illustrated in FIG. 7A than the alternating firing pattern illustrated in FIG. 7B. Similarly, the torque differential applied to the firing pattern illustrated in FIG. 7B including the alternating of two stronger cylinders and one weaker cylinder may be varied differently than the torque differential applied to the firing pattern illustrated in FIG. 7C including the alternating of one stronger cylinder and two weaker cylinders.

Furthermore, as will be described with reference to FIGS. 8 and 9, in some examples, an engine may include asymmetric intake and/or exhaust systems for compensating for asymmetries that may occur under certain engine operations. In particular, FIGS. 8A-8D illustrate example intake systems for an engine having a first cylinder group (cylinder group 1) and a second cylinder group (cylinder group 2). Cylinder group 1 and cylinder group 2 can each include one or more engine cylinders. For example, half of the engine cylinders may be included in cylinder group 1 and half of the engine cylinders may be included in cylinder group 2. As another example, one third of the engine cylinders can be included in cylinder group 1 while the remaining two thirds of the engine cylinders can be included in cylinder group 2. Thus, it should be appreciated that the cylinder groups need not have the same number of cylinders. For example, as described above with reference to FIGS. 7B and 7C, some engines may be operated with an unequal number of stronger cylinders (e.g. higher torque output) and weaker cylinders (e.g. lower torque output). Further, cylinder group 1 can include stronger cylinders only and cylinder group 2 can include weaker cylinders only, or cylinder groups 1 and 2 can include a mixture of stronger and weaker cylinders.

Figure 8A:
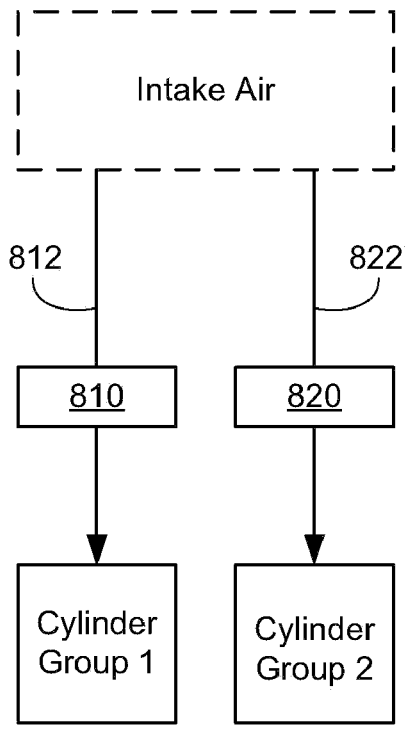
FIGS. 8A, 8B, 8C, and 8D schematically illustrate example intake systems that may be used with the various engine configurations described herein.

As illustrated in FIG. 8A, cylinder group 1 can receive intake air via intake passage 812 and cylinder group 2 can receive intake air via intake passage 822. Thus, cylinder group 1 and cylinder group 2 can receive intake air via separate intake passages. Further, intake passages 812 and 822 can include one or more intake system devices indicated 810 and 820, respectively. For example, intake devices 810 and/or 812 can include a boosting device such as a compressor of a turbocharger or supercharger, and/or can include a throttle for controlling the airflow to the respective cylinder group. Further, intake devices 810 and 820 can be the same or different, or can be operated in the same manner or differently depending on the requirements of cylinder groups 1 and 2.

As one example, where the cylinders of cylinder group 1 are to be operated at a lower torque output (e.g. weaker cylinder operation) than the cylinders of cylinder group 2, the condition of device 810 can be adjusted differently than device 820. For example, where intake devices 810 and 820 include compressors for boosting the intake air, the amount of boost provided by compressor 810 can be adjusted at a different rate than the amount of boost provided by compressor 820 to cause a torque differential between the cylinders of cylinder group 1 and cylinder group 2. Alternatively, where the torque produced by cylinder group 1 and cylinder group 2 are to be set to a substantially equal value, the operation of compressors 810 and 820 can be operated in a similar manner to provide a similar level of boost.

As another example, where devices 810 and 820 include throttles and where the cylinders of cylinder group 1 are to be operated at a lower torque output (e.g. weaker cylinder operation) than the cylinders of cylinder group 2, the position of throttle 810 can be adjusted differently than throttle 820. In this manner, one side of a symmetric yet segregated intake system can be adjusted differently than the other side to provide a torque differential between the engine cylinders or conversely, to eliminate a torque differential between the cylinders.

Figure 8B:
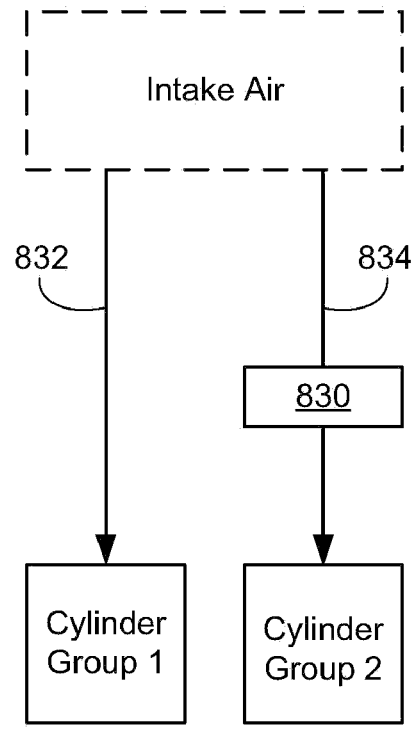

As illustrated in FIG. 8B, the intake system can be asymmetric and include separate or segregated intake passages. For example, cylinder group 1 can receive intake air via a first intake passage 832 while cylinder group 2 can receive intake air via a second intake passage 834. Further, intake passage 834 can include an additional or different intake system device 830. For example, device 830 may include a throttle or boosting device that can be operated to provide a particular torque differential between the cylinders of cylinder group 1 and cylinder group 2.

Figure 8C:
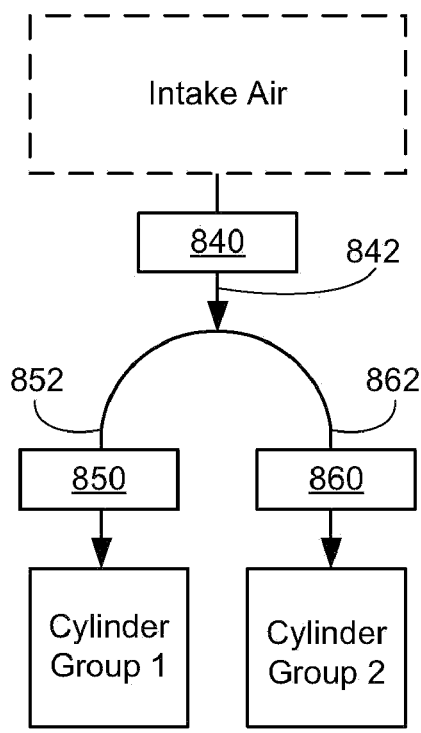
Figure 8D:
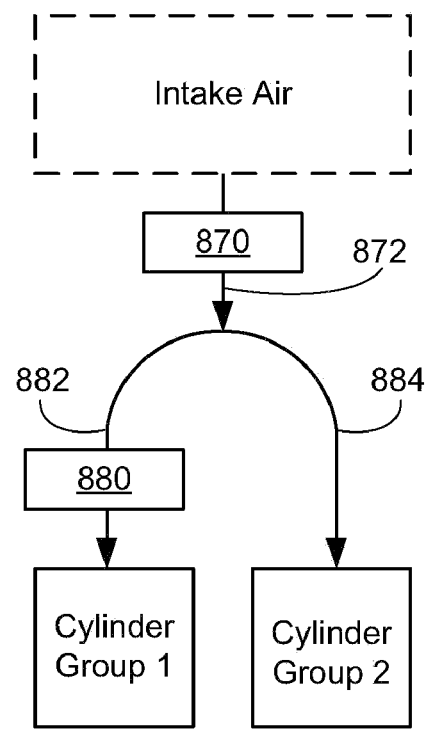

As FIGS. 8A and 8B illustrate examples of symmetric and asymmetric segregated intake systems, FIGS. 8C and 8D illustrate examples of combined intake systems that can include a symmetric or asymmetric configuration.

As one example, FIG. 8C illustrates a combined intake system that receives intake air via a common intake passage 842, which can include an intake system device 840. Device 840 can include a boosting device such as a turbocharger or supercharger compressor and/or can include a throttle, for example. Intake passage 842 can supply intake air to intake passages 852 and 862 for providing intake air to cylinder groups 1 and 2, respectively. Intake passage 852 can include an intake device 850 and/or intake passage 862 can include intake device 860. Devices 850 and 860 can include, for example, a boosting device and/or a throttle. Further, devices 850 and 860 can be the same or can be different. For example, devices 850 and 860 may each include a turbocharger or a throttle. Alternatively, device 850 can include a boosting device while device 860 can include a throttle. Further, devices 850 and 860 can be operated in a similar manner or in a different manner based on operating conditions. For example, where devices 850 and 860 are each boosting devices, the amount of boost provided to cylinder group 1 can be adjusted differently than the amount of boost provided to cylinder group 2, for example, as described above with reference to FIG. 8A. However, one difference between the configuration of FIGS. 8A and 8C is the common intake passage 842 including intake device 840. For example, device 840 can be controlled to vary the torque produced by both cylinder group 1 and cylinder group 2, while devices 850 and 860 can be adjusted to vary the ratio of torque produced by the cylinders of cylinder group 1 to the cylinders of cylinder group 2.

As another example, FIG. 8D illustrates a combined intake system that receives intake air via a common intake passage 872, which can include an intake system device 870. Device 870 can include a boosting device such as a turbocharger or supercharger compressor and/or can include a throttle, for example. Intake passage 872 can supply intake air to intake passages 882 and 884 for providing intake air to cylinder groups 1 and 2, respectively. Intake passage 882 can include an intake device 880 while intake passage 884 does not include an intake device found in intake passage 882. Device 880 can include, for example, a boosting device and/or a throttle. Thus, by varying an operating condition or device 870, the amount of torque produced by cylinder groups 1 and 2 can be varied, while an adjustment of device 880 can be used to vary the torque produced by cylinder group 1 differently than cylinder group 2. In this way, a torque differential may be created between a first and a second group of cylinders by adjusting a condition of the intake air provided to the cylinders.

Figure 9A:
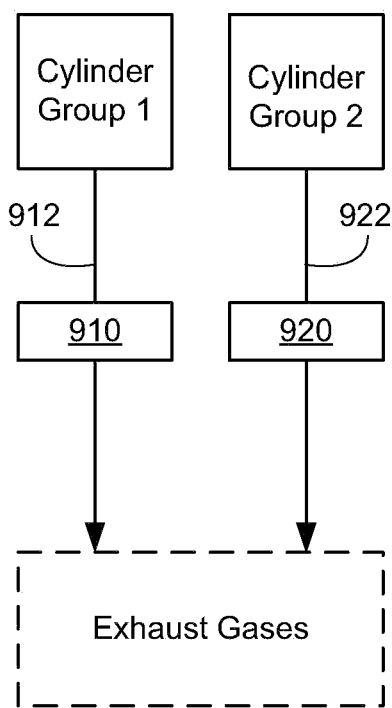
FIGS. 9A, 9B, 9C, and 9D schematically illustrate example exhaust systems that may be used with the various engine configurations described herein.
Figure 9B:
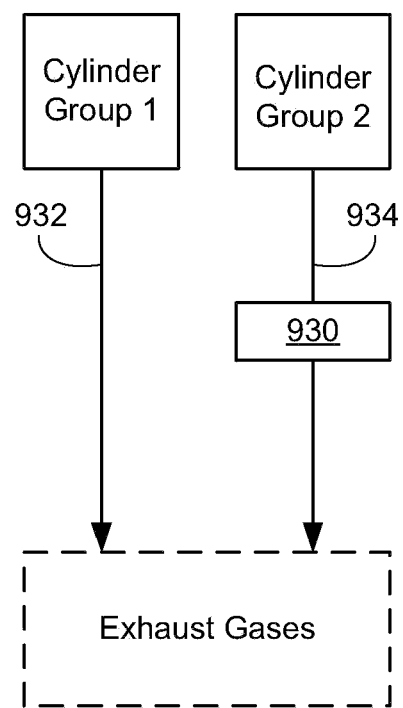

As described herein with reference to FIGS. 8A-8D, various intake system configurations that may be used to enable the application of torque differentials between at least two cylinder groups. FIGS. 9A-9B illustrate various exhaust system configurations that may be used to enable the aftertreatment of exhaust gases produced by at least two cylinder groups that are operated with a torque difference between their respective cylinders during at least some conditions. Note that the various exhaust system configurations illustrated in FIGS. 9A-9D may be used in combination with the various intake system configurations illustrated in FIGS. 8A-8D to achieve a synergistic effect as will be described in greater detail herein.

Referring now to FIGS. 9A and 9B, dual independent exhaust systems are illustrated. FIG. 9A, for example, illustrates a first cylinder group (cylinder group 1) exhausting products of combustion via exhaust passage 912 that includes an intermediate exhaust system device 910. Similarly, a second cylinder group (cylinder group 2) is shown exhausting products of combustion via exhaust passage 922 that include an intermediate exhaust system device 920. Exhaust system devices 912 and 920 can each include one or more of an exhaust throttle, an aftertreatment device (e.g. catalyst, storage device, filter, etc.), and/or an exhaust gas turbine associated with a turbocharger. Exhaust devices 910 and 920 can include a similar device or may include different devices. For example, exhaust device 910 can include a larger or different catalyst than device 920, whereby cylinder group 1 associated with device 910 produces a larger quantity of particular exhaust products than cylinder group 2. In this way, the exhaust system of FIG. 9A can be configured as a symmetric or asymmetric system.

FIG. 9B illustrates a dual independent exhaust system having an asymmetric configuration. For example, cylinder group 1 includes an exhaust passage 932 while cylinder group 2 includes an exhaust passage 934 having an intermediate exhaust device 930, which is not included in exhaust passage 932. Note that exhaust device 930 can include a throttle, a turbine portion of a turbocharger, and/or one or more aftertreatment devices. In this way, differences in exhaust gases produced by the first and second cylinder groups can be treated differently, at least where the first and second groups of cylinders are operated with a torque differential.

Figure 9C:
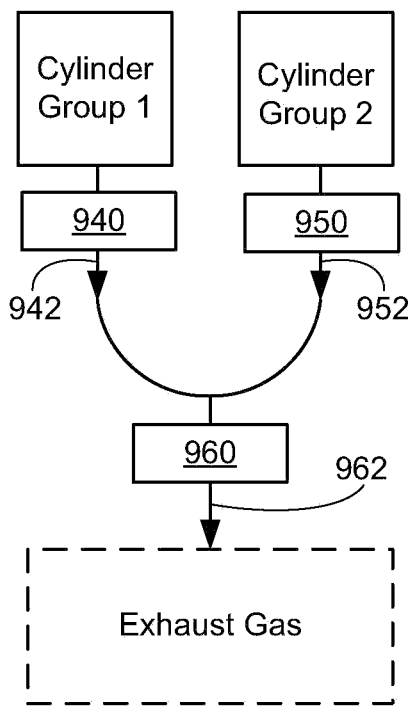
Figure 9D:
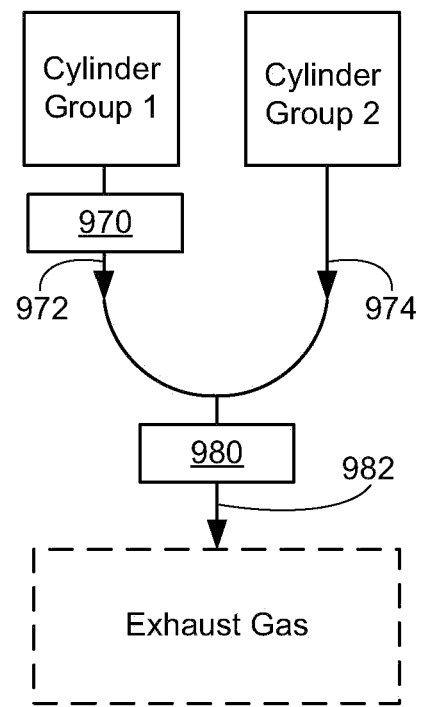

FIGS. 9C and 9D illustrate other exhaust system configurations wherein the exhaust passages of the first and second cylinder groups are combined. For example, FIG. 9C shows cylinder group 1 including an exhaust passage 942 having an intermediate exhaust device 940 and cylinder group 2 including an exhaust passage 952 having an intermediate exhaust device 950. As described above with reference to FIG. 9A, exhaust devices 940 and 950 can be the same or different, depending on the particular control strategy employed with regards to cylinder groups 1 and 2. Further, exhaust passages 942 and 952 are combined at exhaust passage 962 that includes an intermediate exhaust device 960. In this way, the exhaust gases received from the first and second cylinder groups can be treated the same or differently depending on their respective devices 940 and 950, while the combined exhaust gas flow may be treated by device 960.

FIG. 9D illustrates an example where the first cylinder group includes an exhaust passage 972 having an intermediate exhaust device 970 and the second cylinder group includes an exhaust passage 974 that does not include the exhaust device 970. In this way, the exhaust system may be configured asymmetrically so that exhaust gases received from cylinder groups producing different levels of torque (during at least some conditions) may be treated differently. Finally, the exhaust passages 972 and 974 may be combined at 982, which may include an intermediate exhaust device 980 for treating the combined exhaust flow of the first and second cylinder groups.

As illustrated in FIGS. 8 and 9, various intake and exhaust system devices can be selected or configured to compensate for asymmetric operation of at least two cylinder groups of the engine, which may be caused, for example, by utilizing a torque differential between the cylinders of the two groups. However, it should be appreciated that the asymmetric intake or exhaust systems are not necessarily required to achieve or compensate for torque differentials between two or more groups of cylinders. For example, as described with reference to FIG. 4C, the torque differential between two groups of cylinders may be alternated or transitioned so that asymmetry of exhaust system operation is reduced where a symmetric exhaust system configuration is utilized.

Referring now to FIGS. 10A, 10B, and 10C, example firing patterns for some of the engines described herein are provided. In each of the tables provides by FIGS. 10A, 10B, and 10C, "S" refers to a stronger (e.g. higher torque producing) cylinder and "W" refers to a weaker (e.g. lower torque producing) cylinder. The numbers arranged along the horizontal axis of the table correspond to the sequential firing event numbers and do not necessarily correspond to the cylinder identification number or the relative position of the cylinder in the engine.

Specifically FIG. 10A provides a table illustrating example firing patterns 1010-1016 for a four cylinder engine. FIG. 10B provides a table illustrating example firing patterns 1020-1032 for a six cylinder engine. FIG. 10C provides a table illustrating example firing patterns 1040-1050 for an eight cylinder engine. Note that these tables provide non-limiting examples of just some of the firing patterns that may be used with the torque differential approaches described herein. Further still, it should be appreciated that the sequential firing event numbers provided by FIGS. 10A-10C may be with reference to any engine event and do not necessarily correspond to the first firing events of the engine after start-up.

As one example, the firing pattern illustrated in FIGS. 6B-6E can correspond to patterns 1010, 1020, and 1040, whereby the firing pattern consecutively alternates between stronger and weaker firing cylinders. As another example, the firing pattern illustrated in FIG. 7A may correspond to pattern 1040. As yet another example, the firing pattern illustrated in FIG. 7B may correspond to pattern 1022. As yet another example, the firing pattern illustrated in FIG. 7C may correspond to pattern 1024. Thus, it should be appreciated that the torque differential between at least two groups of cylinders may be applied to any of the firing patterns illustrated by FIGS. 10A, 10B, and 10C, among others not necessarily set forth explicitly herein.

Figure 11A:
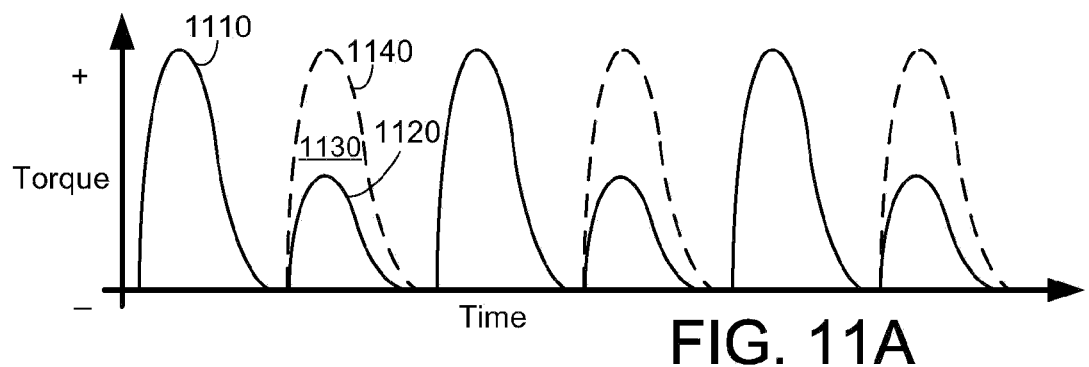
FIGS. 11A, 11B, and 11C are graphs illustrating example engine torque pulsations.
Figure 11B:
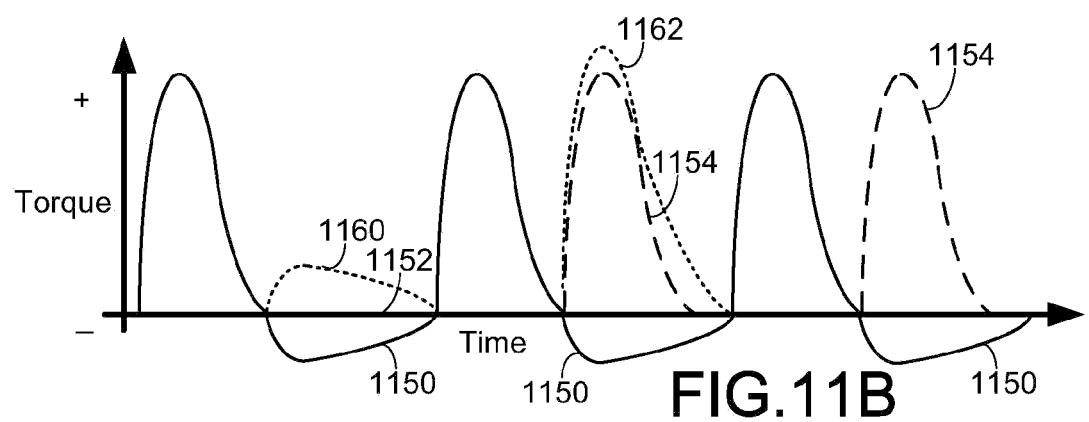
Figure 11C:
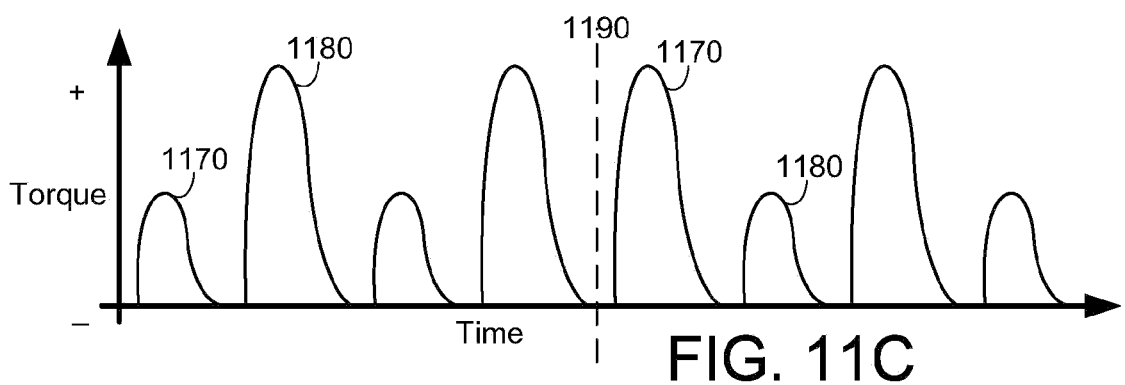

Referring now to FIGS. 11A and 11B, graphs illustrating example torque pulsations for an engine and motor coupled in a hybrid propulsion system. The operations illustrated in FIGS. 11A and 11B can correspond to the operation performed at 432 of FIG. 4B. Referring specifically to FIG. 11A, a firing pattern is illustrated whereby the engine cylinders are alternating (not necessarily consecutively) as stronger cylinders indicated at 1110 and weaker cylinders indicated at 1120. As indicated at 1140, the motor may be controlled to supply torque to the driveline of the vehicle to provide a substantially similar level of torque as previous and/or subsequent firing cylinders. For example, the motor may be operated to produce an amount of torque corresponding to the torque differential between the firing of cylinder 1110 and 1120, which is represented as 1130.

Referring specifically to FIG. 11B, a torque differential is illustrated where a stronger firing cylinder produces a positive torque while a second cylinder or group of weaker cylinder produce a negative torque as indicated at 1150. As illustrated at 1160, the motor may be operated to supply torque to the driveline to produce a net zero torque as indicated at 1152. Alternatively, as illustrated at 1162, the motor may be operated to supply torque to the driveline to produce a substantially similar torque pulsation 1154 as the previous or subsequent stronger cylinders. In this manner, by selectively operating the motor responsive to the torque differential and the frequency of the firing cylinders, the NVH may be reduced, at least under some conditions.

Referring now to FIG. 11C, a graph illustrating example torque pulsations where a torque differential transition is performed, for example, as described herein with reference to FIG. 4C. In this particular example, weaker cylinders produce torque pulsations indicated at 1170 and stronger cylinders produce torque pulsations indicated at 1180. As indicated at 1190, a transition is performed, for example, as described with reference to the operation at 442 of FIG. 4C. Thus, the stronger cylinders are transitioned to weaker cylinders and the weaker cylinders are transitioned to stronger cylinders at 1190.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an internal combustion engine having a plurality of cylinders including at least a first cylinder and a second cylinder, the method comprising:
    firing the first cylinder and the second cylinder in an alternating sequence;
    during a first mode, adjusting an operating parameter of the engine to produce a first difference between an amount of torque produced by the firing of the first cylinder and an amount of torque produced by the firing of the second cylinder;
    during a second mode, adjusting the operating parameter of the engine to produce a second difference between an amount of torque produced by the firing of the first cylinder and an amount of torque produced by the firing of the second cylinder;
    during a third mode, discontinuing firing of the second cylinder for at least one cycle of the engine; and
    performing the first mode at a higher engine speed than the second mode, and performing the third mode at higher engine speeds than the first mode;
    the first difference being greater than the second difference.

2. The method of claim 1 further comprising, performing the first mode at a higher engine load than the second mode.

3. The method of claim 1, wherein the operating parameter includes an amount of air delivered to at least one of the first cylinder and the second cylinder, and wherein the amount of air is varied by adjusting at least one of a valve timing, a level of boost, or a throttle position.

4. The method of claim 1, wherein the operating parameter includes a spark timing of at least one of the first cylinder and the second cylinder.

5. The method of claim 1, wherein the operating parameter includes an amount of fuel delivered to at least one of the first cylinder and the second cylinder.

6. The method of claim 1, further comprising:
    during the first mode, operating the first cylinder in a spark ignition mode and the second cylinder in a compression ignition mode; and
    during the second mode, operating the first cylinder and the second cylinder in the spark ignition mode.

7. The method of claim 1, further comprising:
    during the first mode, operating the first cylinder with a richer air/fuel ratio than the second cylinder; and
    during the second mode, operating the first cylinder and the second cylinder with substantially the same air/fuel ratio.

8. The method of claim 7, wherein during the first mode, the first cylinder is operated with an air/fuel ratio that is substantially stoichiometric and the second cylinder is operated with an air/fuel ratio that is lean of stoichiometry; and wherein a mixture of air and fuel within the second cylinder just prior to combustion is homogeneous or stratified.

9. The method of claim 1, further comprising:
    during the first mode, supplying a first fuel mixture to the first cylinder and a second fuel mixture to the second cylinder, wherein the first fuel mixture includes a greater concentration of an alcohol than the second fuel mixture.

10. The method of claim 1 further comprising, discontinuing firing of the second cylinder for at least one cycle of the engine in response to further increased engine speed.

11. A method of operating an internal combustion engine having a plurality of cylinders, the method comprising:
    firing each cylinder of a first group of engine cylinders in a first firing pattern to produce a first torque differential between each cylinder of the first group and each cylinder of a second group of engine cylinders, and varying the first torque differential by a first amount in response to a change in engine speed, the first torque differential based on the first firing pattern; and
    firing each cylinder of the first group of engine cylinders in a second firing pattern different than said first pattern to produce a second torque differential between each cylinder of the first group and each cylinder of the second group, and varying the second torque differential by a second amount different from the first amount in response to the change in engine speed, the second torque differential based on the second firing pattern.

12. The method of claim 11, wherein at least one of the first and second torque differentials are increased with increasing engine speed.

13. The method of claim 12, wherein the first group includes a first number of cylinders during engine operation in the first pattern and the second group includes a second number of cylinders different than the first number during engine operation in the second pattern.

14. The method of claim 12, wherein the first group includes at least one cylinder and the second group includes at least one cylinder; and wherein each cylinder of the first group produces a greater amount of torque than each cylinder of the second group.

15. The method of claim 12, further comprising firing each cylinder of the second group in an alternating sequence with the firing of the first group of cylinders at least during the first pattern and disabling firing of the second group of cylinders during the second pattern.

16. A method for operating first and second engine cylinder groups, comprising:
   during firing of the cylinders in the first and second groups and in response to increasing engine speed, increasing a differential torque amount and an air-fuel ratio between the first and second groups by differentially adjusting fueling between the groups; and
   further adjusting the differential torque amount by further adjusting the fueling between the groups in response to a cylinder group firing pattern change.

* * * * *